(12) United States Patent
Kinouchi et al.

(10) Patent No.: US 7,563,850 B2
(45) Date of Patent: Jul. 21, 2009

(54) POLYELECTROLYTE COMPOSITIONS

(75) Inventors: Masayuki Kinouchi, Ube (JP); Tetsuji Hirano, Ube (JP); Nobuharu Hisano, Ube (JP)

(73) Assignee: Ube Industries, Ltd., Ube-Shi (JP)

( * ) Notice: Subject to any disclaimer, the term of this patent is extended or adjusted under 35 U.S.C. 154(b) by 38 days.

(21) Appl. No.: 10/497,305

(22) PCT Filed: Nov. 29, 2002

(86) PCT No.: PCT/JP02/12510

§ 371 (c)(1),
(2), (4) Date: Jun. 1, 2004

(87) PCT Pub. No.: WO03/046080

PCT Pub. Date: Jun. 5, 2003

(65) Prior Publication Data

US 2005/0069780 A1    Mar. 31, 2005

(30) Foreign Application Priority Data

| Nov. 29, 2001 | (JP) | ............................. 2001-364298 |
| Jan. 11, 2002 | (JP) | ............................. 2002-004683 |
| Mar. 6, 2002 | (JP) | ............................. 2002-060407 |
| Apr. 18, 2002 | (JP) | ............................. 2002-116550 |
| May 2, 2002 | (JP) | ............................. 2002-130568 |

(51) Int. Cl.
| C08L 81/00 | (2006.01) |
| C08F 283/00 | (2006.01) |
| C08F 65/48 | (2006.01) |
| C08G 8/02 | (2006.01) |
| C08G 8/04 | (2006.01) |
| C08G 8/14 | (2006.01) |
| C08G 8/26 | (2006.01) |
| C08G 14/00 | (2006.01) |
| C08G 14/02 | (2006.01) |
| C08G 14/04 | (2006.01) |
| C08G 16/00 | (2006.01) |
| C08G 61/02 | (2006.01) |
| C08G 59/00 | (2006.01) |
| C08G 65/08 | (2006.01) |
| C08G 65/14 | (2006.01) |
| C08G 65/38 | (2006.01) |
| C08G 75/00 | (2006.01) |
| C08F 220/12 | (2006.01) |
| C08G 18/80 | (2006.01) |
| C08G 75/02 | (2006.01) |
| C08F 297/02 | (2006.01) |
| C08J 3/09 | (2006.01) |
| C08K 5/34 | (2006.01) |
| C08K 5/48 | (2006.01) |
| C08K 3/00 | (2006.01) |
| C08L 25/00 | (2006.01) |
| H01B 1/12 | (2006.01) |
| H01M 2/00 | (2006.01) |
| H01M 8/10 | (2006.01) |
| H01M 6/14 | (2006.01) |
| H01M 6/18 | (2006.01) |

(52) U.S. Cl. .................. 525/534; 427/372.2; 427/385.5; 429/33; 429/303; 429/304; 429/307; 429/317; 523/134; 523/331; 523/305; 524/401; 524/86; 524/577; 524/609; 525/471; 525/535; 528/86; 528/125; 528/126; 528/127; 528/128; 528/129; 528/150; 528/154; 528/151; 528/158; 528/171; 528/212; 528/218; 528/219; 528/391; 528/99

(58) Field of Classification Search ................ 524/401, 524/86, 577, 609; 523/134, 331, 305; 427/372.2, 427/385, 385.5; 528/99, 86, 125, 126, 127, 528/128, 129, 150, 154, 151, 158, 171, 212, 528/218, 219, 391; 429/33, 303, 304, 307, 429/314, 316, 317; 525/471, 534, 535

See application file for complete search history.

(56) References Cited

U.S. PATENT DOCUMENTS 5,643,490 A    7/1997 Takahashi et al.

(Continued)

FOREIGN PATENT DOCUMENTS

JP           64-6027           1/1994

(Continued)

OTHER PUBLICATIONS

Translation of JP 10-101873.*

(Continued)

Primary Examiner—Patrick D Niland
(74) Attorney, Agent, or Firm—Young & Thompson

(57) ABSTRACT

An inexpensive and durable polyelectrolyte composition includes both an aromatic polymer containing carbonyl linkages and/or sulfonyl linkages in the backbone chain and bearing cation-exchange groups and a fused salt exhibits a high ionic conductivity even in the absence of water or a solvent. The aromatic polymer is preferably an aromatic polyether sulfone comprising specific structural units and bearing cation-exchange groups, an aromatic polyether ketone comprising specific structural units and bearing cation-exchange groups, an aromatic polyether sulfone block copolymer consisting of at least one hydrophilic segment bearing cation-exchange groups and at least one hydrophobic segment free from cation-exchange groups, and/or an aromatic polyether ketone block copolymer consisting of at least one hydrophilic segment bearing cation-exchange groups and at least one hydrophobic segment free from cation-exchange groups. The use of such a block copolymer as the aromatic polymer gives polyelectrolyte compositions which are excellent in maintenance of structure even at high temperature.

1 Claim, 1 Drawing Sheet

U.S. PATENT DOCUMENTS

| | | | |
|---|---|---|---|
| 5,679,482 | A | 10/1997 | Ehrenberg et al. |
| 2001/0041279 | A1* | 11/2001 | Terahara et al. ............... 429/33 |

FOREIGN PATENT DOCUMENTS

| | | |
|---|---|---|
| JP | 7-118480 | 5/1995 |
| JP | 8-245828 | 9/1996 |
| JP | 10-83821 | 3/1998 |
| JP | 10-101873 | 4/1998 |
| JP | 10-265673 | 10/1998 |
| JP | 11-502245 | 2/1999 |
| JP | 11-86632 | 3/1999 |
| JP | 11-116679 | 4/1999 |
| JP | 11-306858 | 11/1999 |
| JP | 2000-3620 | 1/2000 |
| JP | 2000-11753 | 1/2000 |
| WO | WO 98/11619 | 3/1998 |

OTHER PUBLICATIONS

Translation of JP 10-265673.*
Translation of JP 11-116679.*
English translation of JP 64-006027.*
Jiazeng Sun et al., "Acid-Organic base swollen polymer membranes". Electrochimica Acta, vol. 46, Nos. 10-11, Mar. 15, 2001, pp. 1703-1708.
Akihiro Noda et al, "Highly conductive polymer electrolytes prepared by in situ polymerization of vinyl monomers in room temperature molten salts", Electrochimica Acta, vol. 45, Nos. 8-9, Jan. 3, 2000, pp. 1265-1270.
Marc Doyle et al., "High-Temperature Proton Conducting Membranes Based on Perfluorinated Ionomer Membrane-Ionic Liquid Composites", Journal of the Electrochemical Society, vol. 147, No. 1, Jan. 2000, pp. 34-37.

* cited by examiner

US 7,563,850 B2

POLYELECTROLYTE COMPOSITIONS

TECHNICAL FIELD

The present invention relates to a polymer electrolyte composition and, in particular, a polymer electrolyte composition useful in fuel cells, secondary batteries, electric double layer capacitors, electrolytic capacitors, etc.

BACKGROUND ART

It is known that ammonium salts of certain kinds, such as imidazolium salts and pyridinium salts, become liquid molten salts at 100° C. or lower, particularly around room temperature, and exhibit high ionic conductivity at relatively low temperatures of 200° C. or lower even in the absence of water or an organic solvent. In view of the unique non-volatility of these molten salts, application as an electrolyte of batteries, etc. has been studied. Being liquid, however, they are not easy to handle. In order to facilitate handling of the molten salts, several proposals have been made on a polymer electrolyte comprising a molten salt immobilized with a polymer.

For example, JP-A-8-245828 discloses a composition comprising an aliphatic quaternary ammonium salt of an organic carboxylic acid and a polymer, such as polyvinyl chloride, polyacrylonitrile or an aliphatic polyether. JP-A-7-118480 discloses a combination of a room-temperature molten salt and a polymer of a vinyl monomer having an alkyl quaternary ammonium salt structure. JP-A-10-83821, JP-A-2000-3620, and JP-A-2000-11753 propose an aliphatic molten salt type polymer synthesized from an imidazolium compound and an acid or an acid monomer. A. Noda, et al., Electrochim Acta, vol. 45, 1265 (2000) and JP-A-11-86632 report a composition of a vinyl polymer and a molten salt. Because all these compositions use a polymer the main chain of which is composed mainly of an aliphatic hydrocarbon group, they are inferior in durability characteristics including resistance to oxidation.

JP-A-11-306858 discloses a composition of a vinylidene fluoride polymer and an imidazolium salt, and J. Electrochem. Soc., vol. 147, 34 (2000), Electrochimica Acta, vol. 46, 1703 (2001), and JP-A-11-86632 teach compositions comprising a perfluoropolymer having an acid group and a molten salt. A composition containing a fluoropolymer is expected to have improved durability but is disadvantageous from the point of view of cost and environmental burdens involved in the production of fluoropolymers. It has therefore been demanded to develop an inexpensive and durable molten salt composition containing a hydrocarbon polymer.

JP-A-10-265673 proposes a polymer composite having an ionic liquid solidified with a non-fluoropolymer. However, an electrolyte composition having a molten salt combined with an aromatic polyether ketone excellent in durability, particularly resistance to oxidative deterioration, is not mentioned in the publication nor known from any other literature. Neither does the publication suggest an electrolyte composition containing a molten salt and a polystyrene-based polymer, which is one of general-purpose resins and inexpensive.

While an aromatic polyether sulfone is inexpensive and excellent in durability such as resistance to oxidative deterioration, an electrolyte composition containing the same and a molten salt is unknown.

DISCLOSURE OF THE INVENTION

An object of the present invention is to provide inexpensive and durable polymer electrolyte composition and membrane which comprise an aromatic polymer and a molten salt and exhibit high ionic conductivity even in the absence of water or a solvent and processes of producing them.

The great bar to achievement of the above object of the invention is that an aromatic polyether sulfone and an aromatic polyether ketone that are superior in durability such as oxidative deterioration resistance is hardly miscible with a molten salt only to provide an unstable composition liable to suffering from molten salt's bleeding.

The present inventors have found that a stable composition can be obtained from an aromatic polyether sulfone or an aromatic polyether ketone and an ammonium molten salt by introducing cation exchange groups into the polymer and thus completed the present invention.

Although an aromatic polyether sulfone and an aromatic polyether ketone are inexpensive polymers with high durability such as oxidative deterioration resistance, molded articles, such as membranes, of compositions of these polymers combined with a liquid molten salt can be plasticized in high temperatures, resulting in reduction of strength.

Accordingly, an object of the invention is to provide inexpensive and durable polymer electrolyte composition and membrane which exhibit high ionic conductivity even in the absence of water or a solvent and excellent structure retention even in high temperatures and processes of producing them.

The present inventors have found that an aromatic polyether sulfone block copolymer and/or an aromatic polyether ketone block copolymer each of which comprises a hydrophilic segment containing a cation exchange group and a hydrophobic segment containing no cation exchange group and an ammonium molten salt form a stable composition having excellent structure retention even in high temperatures.

In synthesizing aromatic polyether sulfone block copolymers, it is known that the reaction between a halogen-terminated prepolymer and a hydroxyl-terminated prepolymer gives a block copolymer having an aromatic polyether sulfone structure in both segments. A fluorine-terminated prepolymer is mostly used as the halogen-terminated prepolymer. When a chlorine-terminated one is used, it is difficult to synthesize a block copolymer because ether exchange reaction occurs to form a random copolymer, as is reported, e.g., in Z. Wang, et al., Polym. Int., vol. 50, 249 (2001). The problem is that the synthesis of a fluorine-terminated prepolymer requires a large quantity of an expensive aromatic difluoro compound.

For the purpose of averting ether exchange reaction, it has been practiced to synthesize the block copolymer using a prepolymer having a specific group introduced into the terminal thereof. For instance, JP-A-64-9230 proposes using a prepolymer having an active chloromethyl group introduced into the terminal thereof. Y. Bourgeois et al., Polymer, vol. 37, 5503 (1996) teaches a process in which an amino-terminated prepolymer and an acid anhydride-terminated prepolymer are allowed to react to form an imido linkage.

However, these proposed processes result in formation of a bonding group of a different kind in the molecular chain, which impairs the heat resistance or water resistance of the polymer.

Accordingly, still another object of the invention is to provide an economical process of producing an aromatic polyether sulfone block copolymer having no bonding group of a different kind in the molecular chain thereof.

Polystyrene, which is another inexpensive polymer, is also hardly miscible with a molten salt and can provide an unstable composition from which a molten salt may bleed out. The inventors have found that a polystyrene polymer and an ammonium molten salt form a stable composition by incorporating a cation exchange group into the polystyrene polymer and has thus reached the present invention.

The above objects of the invention are accomplished by the following polymer electrolyte composition, polymer electrolyte membrane, processes of producing them, and process of producing an aromatic polyether sulfone block copolymer.

The present invention provides a polymer electrolyte composition characterized by comprising a molten salt and an aromatic polymer having a carbonyl bond and/or a sulfonyl bond in the main chain thereof and containing a cation exchange group.

The aromatic polymer preferably includes the one having a structural unit represented by chemical formula (1) shown below and/or a structural unit represented by chemical formula (2) shown below and containing a cation exchange group.

Chemical Formula (1)

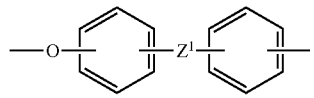

wherein $Z^1$ represents C=O or O=S=O.

Chemical Formula (2)

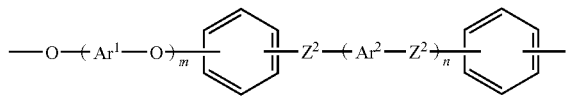

wherein m is 0, 1 or 2; n is 0 or 1; and $Z^2$ represents C=O or O=S=O; and $Ar^1$ and $Ar^2$ each represent a divalent aromatic group.

The aromatic polymer preferably includes an aromatic polyether sulfone having a structural unit represented by chemical formula (3) shown below and/or a structural unit represented by chemical formula (4) shown below and containing a cation exchange group.

Chemical Formula (3)

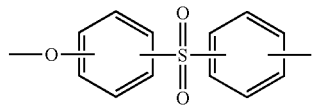

Chemical Formula (4)

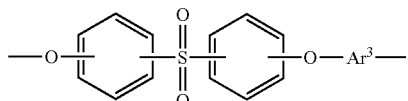

wherein $Ar^3$ represents an aromatic divalent group.

The aromatic polymer preferably includes an aromatic polyether ketone having a structural unit represented by chemical formula (5) shown below and containing a cation exchange group.

Chemical Formula (5)

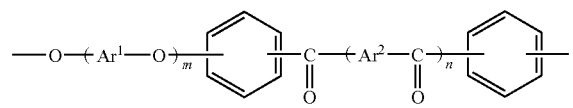

wherein m is 0, 1 or 2; n is 0 or 1; and $Ar^1$ and $Ar^2$ each represent a divalent aromatic group.

The aromatic polymer preferably includes an aromatic polyether sulfone block copolymer and/or an aromatic polyether ketone block copolymer. Each of the aromatic polyether sulfone block copolymer and the aromatic polyether ketone block copolymer comprises a hydrophilic segment containing a cation exchange group and a hydrophobic segment containing no cation exchange group.

The present invention also provides a polymer electrolyte membrane characterized by comprising the above-described polymer electrolyte composition of the present invention.

The present invention also provides a method of preparing the above-described polymer electrolyte composition of the invention, which is characterized by comprising dissolving predetermined amounts of the aromatic polymer and the molten salt in a solvent capable of dissolving both and removing the solvent by drying.

The present invention also provides a method of producing the above-described polymer electrolyte membrane of the invention, which is characterized by comprising dissolving predetermined amounts of the aromatic polymer and the molten salt in a solvent capable of dissolving both, casting the resulting solution, and removing the solvent by drying.

The present invention also provides a method of producing the above-described polymer electrolyte composition or polymer electrolyte membrane according to the invention, which is characterized by comprising immersing a molded article of the aromatic polymer in the molten salt to impregnate the aromatic polymer with the molten salt.

The present invention also provides a preferred process of preparing the above-described aromatic polyether sulfone block copolymer that can be used in the invention. That is, the present invention provides a process of preparing an aromatic polyether sulfone block copolymer comprising (a) a segment represented by chemical formula (10) shown below and (b) a segment represented by chemical formula (11) shown below, which is characterized by comprising allowing (A) an aromatic polyether sulfone prepolymer having the segment (a) and (B) a prepolymer having the segment (b) and bearing at least one terminal hydroxyl group in the form of an alkali metal salt to react in a solution.

Chemical Formula (10)

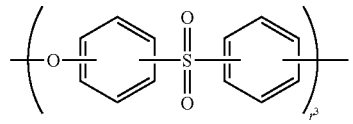

wherein $r^3$ represents an integer of 5 to 1500.

Chemical Formula (11)

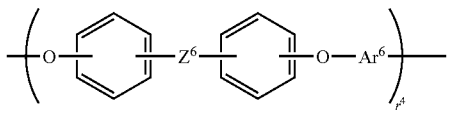

wherein $Z^6$ represents C=O or O=S=O; $Ar^6$ represents a divalent aromatic group composed of an aromatic ring that is not bonded to an electron attractive group; and $r^4$ represents an integer of 5 to 300.

The present invention also provides a polymer electrolyte composition characterized by comprising a molten salt and a polystyrene polymer having a structural unit represented by chemical formula (12) shown below and/or a structural unit represented by chemical formula (13) shown below.

Chemical Formula (12)

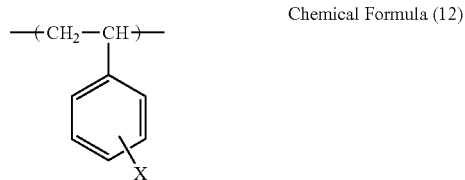

wherein X represents a cation exchange group.

Chemical Formula (13)

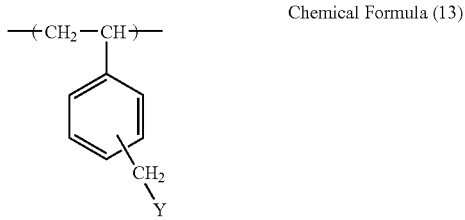

wherein Y represents a cation exchange group.

BEST MODE FOR CARRYING OUT THE INVENTION

Figure 1:
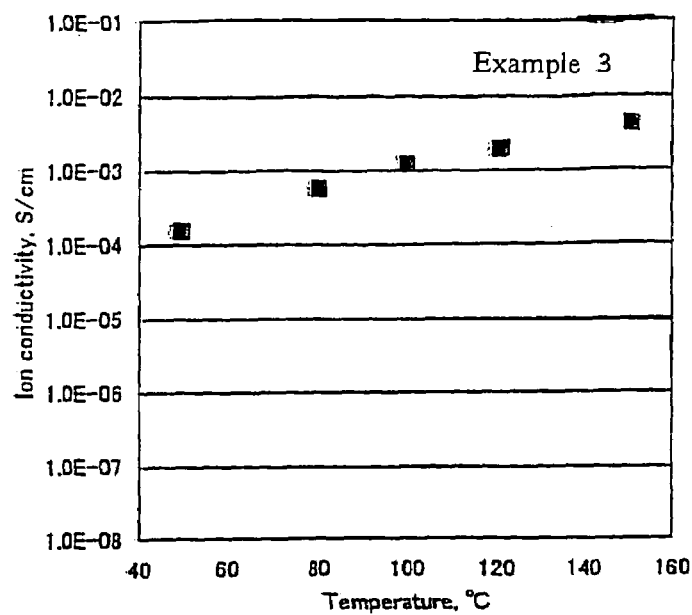
FIG. 1 is a graph showing the temperature dependence of ionic conductivity of the polymer electrolyte membrane prepared in Example 3.

The aromatic polymers used in the present invention which contain a carbonyl bond and/or a sulfonyl bond in the main chain thereof and have a cation exchange group preferably include an aromatic polymer comprising the structural unit represented by chemical formula (1) and/or the structural unit represented by chemical formula (2) and containing a cation exchange group; particularly an aromatic polyether sulfone comprising the structural unit represented by chemical formula (3) and/or the structural unit represented by chemical formula (4); an aromatic polyether ketone comprising the structural unit represented by chemical formula (5); and an aromatic polyether sulfone block copolymer and/or an aromatic polyether ketone block copolymer both of which comprise a hydrophilic segment containing a cation exchange group and a hydrophobic segment containing no cation exchange group.

The aromatic polyether sulfone comprising the structural unit represented by chemical formula (3) and/or the structural unit represented by chemical formula (4) and containing a cation exchange group will be described in more detail.

The aromatic polyether sulfone which is a copolymer may be a random copolymer or a block copolymer.

The aromatic divalent group represented by $Ar^3$ in chemical formula (4) preferably includes the following ones.

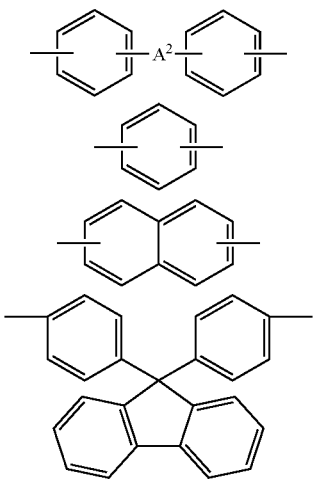

wherein $A^2$ represents a single bond, —O— or —C($R^1$)($R^2$)—. Of these aromatic groups the following ones are particularly preferred.

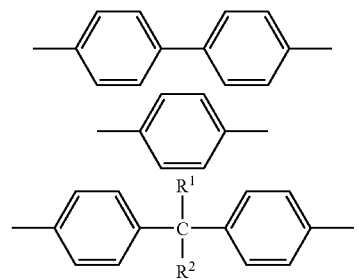

wherein $R^1$ and $R^2$ each represent an alkyl group having 1 to 6 carbon atoms which may be substituted with a halogen atom or a cation exchange group.

The cation exchange group the aromatic polyether sulfone contains preferably includes a sulfonic acid group and a carboxyl group.

The ion exchange capacity of the cation exchange group-containing aromatic polyether sulfone is preferably 0.3 to 7 meq/g, more preferably 0.4 to 7 meq/g. With an ion exchange capacity below the lower limit, the polymer is not sufficiently mixed with a molten salt (described infra), and the resulting composition tends to suffer from bleeding out of the molten salt.

The position of the cation exchange group is not particularly limited Examples of the aromatic polyether sulfone structural unit having a cation exchange group in, for example, $Ar^3$ in chemical formula (4) are shown below.

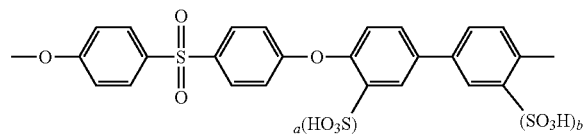

wherein a and b each represent 0 or 1 with the proviso that a and b do not simultaneously represent 0.

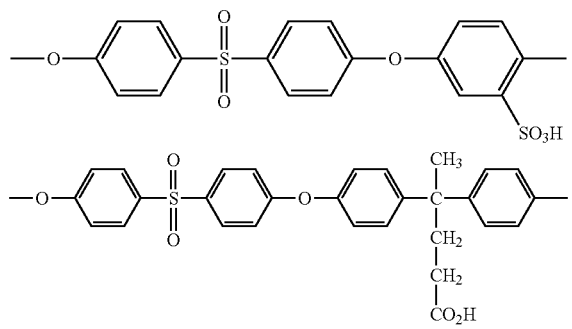

The aromatic polyether sulfone which is a block copolymer preferably includes one comprising a hydrophobic segment represented by chemical formula (14) shown below and a hydrophilic segment represented by chemical formula (15) shown below.

Chemical Formula (14)

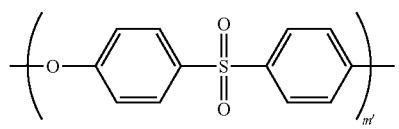

wherein m' represents an integer of 3 to 1500.

Chemical Formula (15)

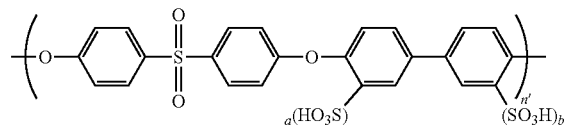

wherein n' represents an integer of 3 to 1500; and a and b each represent 0 or 1 with the proviso that a and b do not simultaneously represent 0.

The cation exchange group-containing aromatic polyether sulfone used in the present invention can be synthesized by, for example, (1) a process including synthesis of a polymer and introduction of a cation exchange group and (2) polymerization of a monomer containing a cation exchange group.

Synthesis of an aromatic polyether sulfone is known in the art. For instance, an aromatic polyether sulfone is synthesized by the reaction between a dialkali metal salt of a dihydric phenol and an aromatic dihalide as taught in R. N. Johnson et al., J. polym. Sci., A-1, vol. 5, 2375 (1967) and JP-B-46-21458.

The aromatic dihalide used in the synthesis of an aromatic polyether sulfone includes bis(halogenophenyl)sulfones, such as bis(4-chlorophenyl)sulfone, bis(4-fluorophenyl)sulfone, bis(4-bromophenyl)sulfone, bis(2-iodophenyl)sulfone, bis(2-chlorophenyl)sulfone, and bis(2-fluorophenyl)sulfone. In view of reactivity and availability, bis(4-chlorophenyl)sulfone and bis(4-fluorophenyl)sulfone are preferred.

The dihydric phenol used in the synthesis of an aromatic polyether sulfone includes dihydroxybenzenes, such as hydroquinone and resorcinol; dihydroxynaphthalenes, such as 1,5-dihydroxynaphthalene, 1,6-dihydroxynaphthalene, 1,7-dihydroxynaphthalene, and 2,7-dihydroxynaphthalene; dihydroxybiphenyls, such as 4,4'-biphenol and 2,2'-biphenol; bisphenyl ethers, such as bis(4-hydroxyphenyl)ether and bis(2-hydroxyphenyl)ether; bisphenylpropanes, such as 2,2-bis(4-hydroxyphenyl)propane, 2,2-bis(3-methyl-4-hydroxyphenyl)propane, and 2,2-bis(3,5-dimethyl-4-hydroxyphenyl)propane; bisphenylmethanes, such as bis(4-hydroxyphenyl)methane; bisphenylsulfones, such as bis(4-hydroxyphenyl)sulfone; bisphenyl sulfides, such as bis(4-hydroxyphenyl)sulfide; bisphenyl ketones, such as bis(4-hydroxyphenyl)ketone; bisphenylhexafluoropropanes, such as 2,2-bis(3,5-dimethyl-4-hydroxyphenyl)hexafluoropropane; and bisphenylfluorenes, such as 9,9-bis(4-hydroxyphenyl)fluorene. Dipotassium salts and disodium salts of these dihydric phenols are preferably used. These compounds can be used either individually or as a combination of two or more thereof. Preferred of them are dipotassium salts and disodium salts of hydroquinone, 4,4'-biphenol, 2,2-bis(4-hydroxyphenyl)propane or bis(4-hydroxyphenyl)sulfone.

The aromatic polyether sulfones synthesized from the above-recited materials include those having the following structural units.

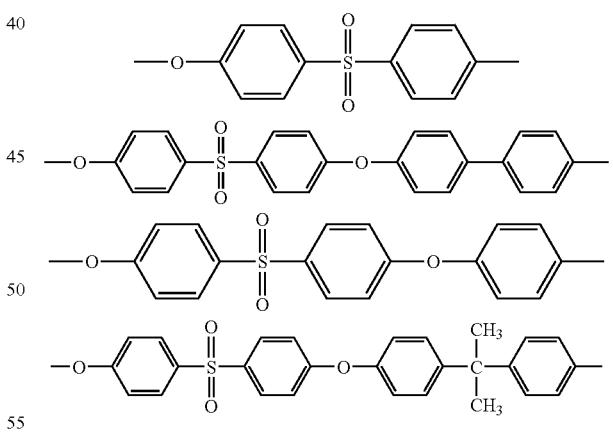

The aromatic polyether sulfone which is a random copolymer can be synthesized at a time by using two or more kinds of dihydric phenols as taught in JP-B-62-28169.

Synthesis of the aromatic polyether sulfone which is a block copolymer is also known. For example, it is synthesized by preparing corresponding prepolymers terminated with a halide or a phenol group so as to be copolymerized with each other and allowing them to react as described in Z. Wang, et al., Polym. Int., vol. 50, 249 (2001) or by linking corresponding prepolymers via a linking group having higher reactivity as described in JP-A-63-258930.

The above-mentioned non-sulfonated aromatic polyether sulfone preferably has a solution viscosity $\eta_{sp/c}$ (measured as a 0.5 g/dl solution in N-methyl-2-pyrrolidone) of 0.1 to 5, particularly 0.2 to 4.

The method of introducing a cation exchange group into the previously prepared aromatic polyether sulfone is not particularly limited, and known techniques can be utilized.

Introduction of a sulfonic acid group is achieved by reaction with a known sulfonating agent, such as sulfuric acid, fuming sulfuric acid or chlorosulfonic acid, as described in JP-A-61-43630 and J. Membr. Sci., vol. 83, 211 (1993).

JP-A-61-43630 teaches that an aromatic polyether sulfone having an aromatic ring that is not bonded to an electron attractive group such as a sulfonyl group can have the aromatic group selectively sulfonated by dissolving the polymer in sulfuric acid and stirring the solution for several hours.

Cation exchange group introduction can also be achieved by lithiumization followed by conversion into sulfonic acid as described, e.g., in J. Polym. Sci., Part A, Polym. Chem., vol. 34, 2421 (1996). More specifically an aromatic polyether sulfone is lithiumized with butyllithium, etc. and then reacted with $SO_2$, followed by treatment with hydrochloric acid to yield an aromatic polyether sulfone having a sulfonic acid group introduced therein.

Introduction of a carboxyl group can be effected by, for example, the method of Polymer, vol. 27, 1626 (1986). More specifically an aromatic polyether sulfone is lithiumized with butyllithium, etc., reacted with $CO_2$, and treated with hydrochloric acid to give an aromatic polyether sulfone having a carboxyl group introduced therein.

An aromatic polyether sulfone containing a cation exchange group can also be synthesized by starting with a monomer containing a cation exchange group.

For example, synthesis starting with a monomer containing a sulfonic acid group is carried out in accordance with the process described in J. Polym. Sci., Part A, Polym. Chem., vol. 31, 853 (1993) and U.S. Patent 2000/0021764A1. More specifically, synthesis is carried out in the same manner as for the above-described aromatic polyether sulfone but by using a sulfonic acid group-containing monomer, such as 3,3'-sulfonyl bis(6-hydroxybenzenesulfonic acid), 3,3'-sulfonyl bis (6-fluorobenzenesulfonic acid), and 3,3'-sulfonyl bis(6-chlorobenzenesulfonic acid). The sulfonic acid group-containing aromatic polyether sulfone synthesized from such a sulfonic acid group-containing monomer may have additional sulfonic acid groups introduced in accordance with the above-described method for sulfonic acid group introduction.

Synthesis starting with a carboxyl-containing monomer is carried out in accordance with the process described in Polymer, vol. 42, 5973 (2001) and ibid, vol. 34, 2836 (1993). More Specifically, the synthesis is carried out in the same manner as for the above-described aromatic polyether sulfone but by using a carboxyl-containing monomer, such as 5-[(4-fluorophenyl)sulfonyl]-2-fluorobenzoic acid or diphenolic acid.

The aromatic polyether ketone used in the invention which has the structural unit represented by chemical formula (5) and contains a cation exchange group is then described in more detail.

The cation exchange group-containing aromatic polyether ketone can be synthesized by, for example, the following processes (1) and (2) similarly to the cation exchange group-containing polyether sulfone.
(1) A process including synthesis of a polymer and introduction of a cation exchange group into the polymer
(2) A process including polymerization of a cation exchange group-containing monomer.

Synthesis of an aromatic polyether ketone is known in the art. For instance, an aromatic polyether ketone is synthesized by the reaction between a dialkali metal salt of a dihydric phenol and an aromatic dihalide as taught in R. N. Johnson, et al., J. polym. Sci., A-1, vol. 5, 2375 (1967) and JP-A-54-90296.

The aromatic dihalide used in the synthesis of an aromatic polyether ketone includes bis(4-chlorophenyl)ketone, bis(4-fluorophenyl)ketone, bis(4-bromophenyl)ketone, bis(4-iodophenyl)ketone, bis(2-chlorophenyl)ketone, bis(2-bromophenyl)ketone, bis(2-fluorophenyl)ketone, 1,4-bis(4-chlorobenzoyl)benzene, and 4,4'-bis(4-chlorobenzoyl) biphenyl. Bis(4-chlorophenyl)ketone and bis(4-fluorophenyl)ketone are preferred.

The dihydric phenol used in the synthesis of an aromatic polyether ketone includes hydroquinone, methylhydroquinone, resorcinol, 4,4'-biphenol, 2,2'-biphenol, bis(4-hydroxyphenyl)ether, bis(2-hydroxyphenyl)ether, and bis(4-hydroxyphenyl)ketone. Dipotassium salts and disodium salts of these dihydric phenols are preferably used. These compounds can be used either individually or as a combination of two or more thereof. Preferred of them are a dipotassium salt and a disodium salt of hydroquinone, 4,4'-biphenol, bis(4-hydroxyphenyl)ether or bis(4-hydroxyphenyl)ketone.

An aromatic polyether ketone can also be synthesized through Friedel-Crafts polycondensation between an aromatic dicarboxylic acid dihalide and an aromatic ether as taught in Y. Iwakura, et al., J. Polym. Sci., A-1, vol. 6, 3345 (1968) and JP-A-6-263871.

The aromatic dicarboxylic acid dihalide used in the synthesis preferably includes terephthaloyl dichloride, isophthaloyl dichloride, 4,4'-oxybisbenzoyl dichloride, 4,4'-biphenyldicarboxylic acid dichloride, 2,2'-biphenyldicarboxylic acid dichloride, 2,6-naphthalenedicarboxylic acid dichloride, and 2,7-naphthalenedicarboxylic acid dichloride.

The aromatic ether used in the synthesis preferably includes diphenyl ether, 1,4-bisphenoxybenzene, 4,4'-bisphenoxybiphenyl, and 4,4'-bisphenoxybenzophenone.

The aromatic polyether ketones synthesized from the above-described materials include those having the following structural units.

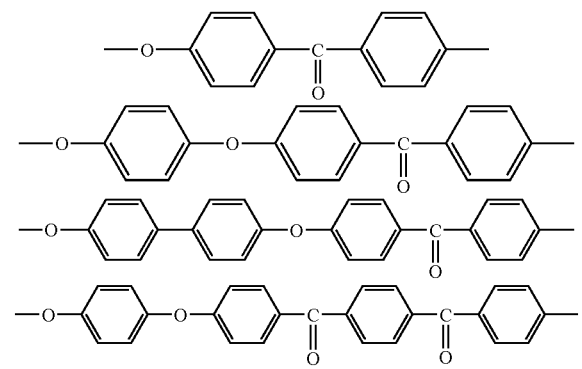

The number of the kinds of the structural units represented by chemical formula (5) making up the aromatic polyether ketone is not limited to one. The aromatic polyether ketone may be one comprising two or more kinds of the structural units represented by chemical formula (5) that is synthesized from three or more kinds of monomers. The aromatic polyether ketone comprising the two or more kinds of the structural units may be a random copolymer or a block copolymer.

The method of introducing a cation exchange group into the previously prepared aromatic polyether ketone is not particularly limited, and known techniques can be used. The cation exchange group preferably includes a sulfonic acid group and a carboxyl group.

Introduction of a sulfonic acid group is achieved by reaction with a known sulfonating agent, such as sulfuric acid, fuming sulfuric acid or chlorosulfonic acid, as described in JP-A-57-25328, JP-A-63-291920, JP-A-6-93114, J. Membr. Sci., vol. 199, 167 (2002), ibid, vol. 173, 17 (2000), Polymer, vol. 28, 1009 (1987), Solid State Ionics, vol. 106, 219 (1998), and Br. Polym. J., vol. 17, 4 (1985).

For instance, JP-A-57-25328 teaches that an aromatic polyether ketone having an aromatic ring that is not bonded to a carbonyl group can have the aromatic group selectively sulfonated by dissolving the polymer in sulfuric acid and stirring the solution for several hours. JP-T-11-502245 discloses a process for sulfonating an aromatic ring having a carbonyl group as well which comprises dissolving a polyether ketone in 94 to 97% sulfuric acid and adding a sulfonating agent such as fuming sulfuric acid or chlorosulfonic acid to the solution to increase the sulfuric acid concentration.

Introduction of a carboxyl group can be achieved by, for example, the process reported in Macromolecules, vol. 26, 5295 (1993). More specifically, a methylated aromatic polyether ketone prepared by using methylhydroquinone is dibrominated with bromine, the dibromomethyl group is hydrolyzed into an aldehyde group, which is then oxidized with sodium chlorite to obtain a carboxyl-containing aromatic polyether ketone.

The cation exchange group-containing aromatic polyether ketone can also be synthesized from a cation exchange group-containing monomer.

In starting with a sulfonic acid group-containing monomer, the desired polymer is obtained by the process described in Polym. Int., vol. 50, 812 (2001). More specifically, the synthesis is carried out in the same manner as for the above-described aromatic polyether ketone from 5,5'-carbonylbis(sodium 2-fluorobenzenesulfonate) and hydroquinone. The sulfonic acid group-containing aromatic polyether ketone synthesized from the sulfonic acid group-containing monomer may have additional sulfonic acid groups introduced in the same manner as described above.

The cation exchange group-containing aromatic polyether ketone preferably has an ion exchange capacity of 0.3 to 7 meq/g. With an ion exchange capacity below the lower limit, the polymer is not sufficiently mixed with a molten salt (described infra), and the resulting composition tends to suffer from the molten salt's bleeding out.

The aromatic polyether sulfone block copolymer and/or the aromatic polyether ketone block copolymer each comprising a hydrophilic segment containing a cation exchange group and a hydrophobic segment containing no cation exchange group will then be described in more detail.

The cation exchange group-containing aromatic polyether sulfone block copolymer and/or aromatic polyether ketone block copolymer can be synthesized by, for example, the following processes (1) and (2).

(1) A process comprising synthesizing a block copolymer that does not contain a cation exchange group and selectively introducing a cation exchange group to form a hydrophilic segment.

(2) A process comprising previously preparing a hydrophobic segment prepolymer and a hydrophilic segment prepolymer having a cation exchange group and allowing the prepolymers to react to produce a block copolymer.

The hydrophobic segment prepolymer, the hydrophilic segment prepolymer, and a prepolymer that is to be rendered hydrophilic by introducing a cation exchange group, each of which is useful to synthesize the aromatic polyether sulfone block copolymer and/or the aromatic polyether ketone block copolymer, are well known as an aromatic polyether sulfone or an aromatic polyether ketone. They can be synthesized by the reaction between a dialkali metal salt of a dihydric phenol and an aromatic dihalide as disclosed in R. N. Johnson, et al., J. Polym. Sci., A-1, vol. 5, 2375 (1967), JP-B-46-21458, and JP-A-54-90296.

The aromatic dihalide used in the synthesis includes bis(4-chlorophenyl)sulfone, bis(4-fluorophenyl)sulfone, bis(4-bromophenyl)sulfone, bis(4-iodophenyl)sulfone, bis(2-chlorophenyl)sulfone, bis(2-fluorophenyl)sulfone, bis(2-methyl-4-chlorophenyl)sulfone, bis(2-methyl-4-fluorophenyl)sulfone, bis(3,5-dimethyl-4-chlorophenyl)sulfone, bis(3,5-dimethyl-4-fluorophenyl)sulfone, bis(4-chlorophenyl)ketone, bis(4-fluorophenyl)ketone, bis(4-bromophenyl)ketone, bis(4-iodophenyl)ketone, bis(2-chlorophenyl)ketone, bis(2-bromophenyl)ketone, bis(2-fluorophenyl)ketone, 1,4-bis(4-chlorobenzoyl)benzene, and 4,4'-bis(4-chlorobenzoyl)biphenyl. These aromatic dihalides can be used either individually or as a combination of two or more thereof. Preferred of them are bis(4-chlorophenyl)sulfone, bis(4-fluorophenyl)sulfone, bis(4-chlorophenyl)ketone, and bis(4-fluorophenyl)ketone are preferred.

The dihydric phenol used in the synthesis includes hydroquinone, methylhydroquinone, resorcinol, 1,5-dihydroxynaphthalene, 1,6-dihydroxynaphthalene, 1,7-dihydroxynaphthalene, 2,7-dihydroxynaphthalene, 4,4'-biphenol, 2,2'-biphenol, bis(4-hydroxyphenyl)ether, bis(2-hydroxyphenyl)ether, 2,2-bis(4-hydroxyphenyl)propane, 2,2-bis(3-methyl-4-hydroxyphenyl)propane, 2,2-bis(3,5-dimethyl-4-hydroxyphenyl)propane, bis(4-hydroxyphenyl)methane, bis(4-hydroxyphenyl)sulfone, bis(4-hydroxyphenyl)sulfide, bis(4-hydroxyphenyl)ketone, 2,2-bis(3,5-dimethyl-4-hydroxyphenyl)hexafluoropropane, and 9,9-bis(4-hydroxyphenyl)fluorenone. Dipotassium salts and disodium salts of these dihydric phenols are preferably used. These compounds can be used either individually or as a combination of two or more thereof. Preferred of them are a dipotassium salt and a disodium salt of hydroquinone, 4,4'-biphenol, 2,2-bis(4-hydroxyphenyl)propane, bis(4-hydroxyphenyl)sulfone, bis(4-hydroxyphenyl)ether or bis(4-hydroxyphenyl)ketone.

In synthesizing the prepolymers as segments, molecular weight regulation and formation of terminal groups used to yield a desired block copolymer are accomplished by using either one of the dihydric phenol and the aromatic dihalide in excess. Otherwise, the same purpose can be achieved by using the dihydric phenol and the aromatic dihalide in an equimolar ratio and adding to the reaction system either one of a monohydric phenol (e.g., phenol, cresol, 4-phenylphenol or 3-phenylphenol) and an aromatic halide (e.g., 4-chlorophenyl phenyl sulfone, 1-chloro-4-nitrobenzene, 1-chloro-2-nitrobenzene, 1-chloro-3-nitrobenzene, 4-fluorobenzophenone, 1-fluoro-4-nitrobenzene, 1-fluoro-2-nitrobenzene or 1-fluoro-3-nitrobenzene).

The aromatic polyether ketone can also be synthesized through Friedel-Crafts polycondensation between an aromatic dicarboxylic acid dihalide and an aromatic ether as taught in Y. Iwakura, et al., J. Polym. Sci., A-1, vol. 6, 3345 (1968) and JP-A-6-263871.

The aromatic dicarboxylic acid dihalide used in the synthesis preferably includes terephthaloyl dichloride, isophthaloyl dichloride, 4,4'-oxybisbenzoyl dichloride, 4,4'-biphenyldicarboxylic acid dichloride, 2,2'-biphenyldicarboxylic acid dichloride, 2,6-naphthalenedicarboxylic acid dichloride, and 2,7-naphthalenedicarboxylic acid dichloride.

The aromatic ether used in the synthesis preferably includes diphenyl ether, 1,4-bisphenoxybenzene, 4,4'-bisphenoxybiphenyl, and 4,4'-bisphenoxybenzophenone.

The prepolymers of the respective segments preferably have a degree of polymerization of 3 to 1500, more preferably 5 to 1000. A prepolymer whose degree of polymerization is 3 or fewer hardly produces a block copolymer with desired characteristics. A prepolymer whose degree of polymerization exceeds 1500 is difficult to copolymerize to give a block copolymer.

The cation exchange group possessed by the aromatic polyether sulfone block copolymer and/or the aromatic polyether ketone block copolymer preferably includes a sulfonic acid group and a carboxyl group.

The aromatic polyether sulfone block copolymer and/or aromatic polyether ketone block copolymer containing a sulfonic acid group as a cation exchange group can be synthesized by a process comprising synthesizing a non-sulfonated block copolymer and selectively sulfonating the block copolymer or a process comprising previously preparing a hydrophobic segment prepolymer and a hydrophilic segment prepolymer containing a sulfonic acid group and allowing the prepolymers to react to produce a block copolymer.

Where the sulfonic acid group-containing aromatic polyether sulfone block copolymer and/or aromatic polyether ketone block copolymer is obtained by selective sulfonation of a previously prepared non-sulfonated block copolymer, it is necessary that the aromatic ring constituting the hydrophobic segment should be bonded to an electron attracting group in order to achieve selective sulfonation to form a hydrophilic segment. In this situation the most preferred hydrophobic segment prepolymer is one having a structural unit represented by chemical formula (6):

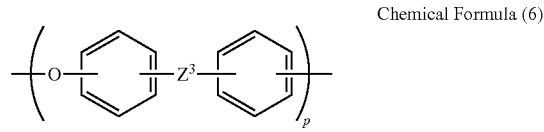

Chemical Formula (6)

wherein $Z^3$ represents C=O or O=S=O; and p represents an integer of 3 to 1500.

On the other hand, the prepolymer that is to be sulfonated to become a hydrophilic segment should be prepared from an aromatic dihalide and the above-recited dihydric phenol the aromatic ring of which is not bonded to an electron attractive group. A prepolymer having a structural unit represented by chemical formula (7) shown below is the most preferred.

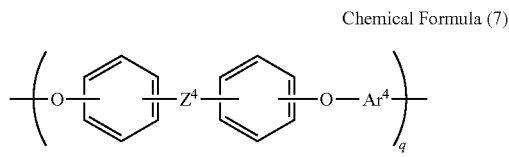

Chemical Formula (7)

wherein $Z^4$ represents C=O or O=S=O; q represents an integer of 3 to 1500; $Ar^4$ represents a divalent aromatic group composed of an aromatic ring that is not bonded to an electron attractive group, preferably

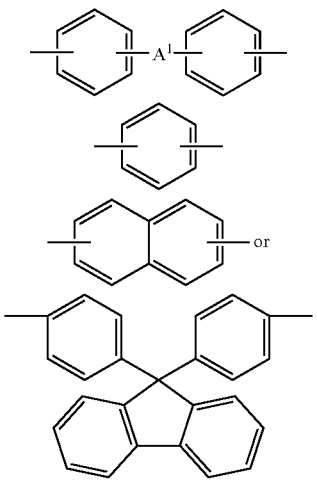

and $A^1$ represents a single bond, O or $C(CH_3)_2$.

The hydrophobic segment prepolymer and the prepolymer that becomes a hydrophilic segment on sulfonation may be commercially available polymers having a corresponding structure. It is also possible to use such a commercially available polymer having been subjected to ether exchange to have a regulated molecular weight or to introduce a terminal group. The ether exchange is carried out using an alkali metal salt of the above-recited dihydric phenol or a monohydric phenol described infra under the same conditions as for the polyether sulfone synthesis described in R. N. Johnson et al., j. Polym. Sci., A-1, vol. 5, 2375 (1967) and JP-B46-21458.

The non-sulfonated block copolymer comprising the hydrophobic segment prepolymer and the prepolymer that becomes a hydrophilic segment after sulfonation is synthesized by reacting the hydrophobic segment prepolymer having a halogen terminal group or a phenol alkyl metal salt terminal group with the prepolymer that becomes a hydrophilic segment after sulfonation and carries a terminal group reactive with that terminal group in accordance with known processes described, e.g., in Z. Wu et al., Angw. Makromol. Chem., vol. 173, 163 (1989), and Z. Wu et al., Polym. Int., vol. 50, 249 (2001). It is also obtainable by reacting the two segment prepolymers both terminated with a phenol alkali metal end group with a linking agent in the same manner. The linking agent includes the above-mentioned aromatic dihalides, preferably highly reactive aromatic dihalides having fluorine as a halogen.

Methods of sulfonating polyether sulfone or polyether ketone are known. Of the aromatic rings of the non-sulfonated block copolymer prepared by the above-described process, those which are not bonded to an electron attracting group are selectively sulfonated to form a hydrophilic segment in accordance with, for example, the methods of JP-A-57-25328, JP-A-61-36781, JP-B-1-54323, and JP-B-2-17571. The aromatic polyether sulfone block copolymer and/or aromatic polyether ketone block copolymer which can be used in the present invention are thus obtained.

The sulfonic acid group-containing aromatic polyether sulfone block copolymer and/or aromatic polyether ketone block copolymer used in the present invention can also be synthesized by allowing a hydrophobic segment prepolymer and a sulfonic acid group-containing hydrophilic segment prepolymer that have separately been prepared to react with each other in the same manner for the non-sulfonated block copolymer.

The sulfonic acid group-containing hydrophilic segment prepolymer is obtained by a process in which the prepolymer that is to become a hydrophilic segment on sulfonation is sulfonated before block copolymerization. It is also obtainable by a process in which a monomer containing a sulfonic acid group is polymerized. In this case, the hydrophilic segment prepolymer may have sulfonated not only its aromatic rings that are not bonded to an electron attractive group but those which are bonded to an electron attractive group.

The above-mentioned hydrophilic segment prepolymer can be obtained by sulfonating a prepolymer by the known sulfonation methods described supra. The sulfonic acid group-containing hydrophilic segment prepolymer can also be obtained by lithiumizing a prepolymer with butyllithium, etc., allowing the lithio-prepolymer to react with $SO_2$, and treating the product with hydrochloric acid as described in J. Polym. Sci., Part A, Polym. Chem., vol. 34, 2421 (1996).

The hydrophilic segment prepolymer can also be synthesized from a monomer containing a sulfonic acid group. For example, the sulfonic acid group-containing hydrophilic segment prepolymer can be synthesized by using a pre-sulfonated aromatic dihalide, such as sodium 5,5'-sulfonylbis(2-chlorobenzenesulfonate) described in M. Ueda et al., J. Polym. Sci.: Part A: Polym. Chem., vol. 31, 853 (1993) and sodium 5,5'-carbonylbis(2-fluorobenzenesulfonate) described in F. Wang et al., Macromol. Chem. Phys., vol. 199, 1421 (1998) and D. Gan et al., Polym. Int., vol. 50, 812 (2001). The hydrophilic segment may have more sulfonic acid groups introduced by the above-mentioned method for sulfonic acid group introduction.

The aromatic polyether sulfone block copolymer and/or aromatic polyether ketone block copolymer containing a carboxyl group as a cation exchange group which can be used in the present invention can be synthesized by a process comprising synthesizing a non-carboxylated block copolymer and selectively carboxylating the block copolymer or a process comprising separately preparing a hydrophobic segment prepolymer and a carboxyl-containing hydrophilic segment prepolymer and allowing the prepolymers to react to form a block copolymer.

Where the carboxyl group-containing aromatic polyether sulfone block copolymer and/or aromatic polyether ketone block copolymer used in the present invention is obtained by carboxylation of a previously prepared non-carboxylated block copolymer, carboxyl group introduction is carried out by, for example, the method taught in Macromolecules, vol. 26, 5295 (1993). Specifically, a hydrophobic segment prepolymer and a prepolymer synthesized by using methylhydroquinone are allowed to react to synthesize a non-carboxylated block copolymer in the same manner as for the preparation of the non-sulfonated block copolymer. The methyl groups originated in the methylhydroquinone are then dibrominated with bromine. The dibromomethyl groups are hydrolyzed into aldehyde groups, which are oxidized with sodium chlorite to obtain a block copolymer having a carboxyl group-containing hydrophilic segment.

Where the aromatic polyether sulfone block copolymer and/or the aromatic polyether ketone block copolymer used in the present invention is obtained by previously preparing a hydrophobic segment prepolymer and a carboxyl group-containing hydrophilic segment prepolymer and block copolymerizing the prepolymers, a prepolymer is synthesized by using methylhydroquinone, and the methyl groups of the resulting prepolymer are converted into carboxyl groups in the same manner as described above to make a hydrophilic segment prepolymer. The resulting hydrophilic segment prepolymer is reacted with a hydrophobic segment prepolymer to synthesize a block copolymer having a carboxyl group-containing hydrophilic segment.

The carboxyl group-containing hydrophilic segment prepolymer that is to be reacted with a hydrophobic segment prepolymer may be one synthesized by the process disclosed, e.g., in Polymer, vol. 27, 1626 (1986). Specifically, the carboxyl group-containing hydrophilic segment is obtainable by lithiumizing a prepolymer with butyllithium, etc., reacting the lithio-prepolymer with $CO_2$, and treating the product with hydrochloric acid.

The block copolymer of the invention can also be obtained by using a hydrophilic segment prepolymer synthesized from a carboxyl group-containing monomer. Such a prepolymer is synthesized from a carboxyl-containing monomer, such as 5-[(4-fluorophenyl)sulfonyl]-2-fluorobenzoic acid or diphenolic acid, as described, e.g., in Polymer, vol. 42, 5973 (2001) and Polymer, vol. 34, 2836 (1993).

The ion exchange capacity of the aromatic polyether sulfone block copolymer and/or aromatic polyether ketone block copolymer used in the invention is preferably 0.1 to 10 meq/g. With an ion exchange capacity below the lower limit, the copolymer is not sufficiently mixed with a molten salt (described infra), and the resulting composition tends to suffer from bleeding out of the molten salt.

The weight fraction of the hydrophilic segment in the aromatic polyether sulfone block copolymer and/or aromatic polyether ketone block copolymer used in the invention is not particularly limited as long as the ion exchange capacity of the copolymer falls within the above-recited range. It is preferably 0.05 to 0.95. The weight fraction of the hydrophilic segment is defined to be the weight of the hydrophilic segment divided by the weight of the block copolymer.

The non-sulfonated aromatic polyether sulfone block copolymer and/or the non-sulfonated aromatic polyether ketone block copolymer used in the present invention preferably have a reduced viscosity $\eta_{sp/c}$ (measured in a 0.5 g/dl solution in N-methyl-2-pyrrolidone) of 0.1 to 3.0 dl/g.

Where, in particular, the aforementioned aromatic polyether sulfone block copolymer and/or aromatic polyether ketone block copolymer is used as the aromatic polymer having a carbonyl bond and/or a sulfonyl bond in the main chain thereof and containing a cation exchange group as specified in the present invention, a polymer electrolyte composition excellent in high-temperature structure retention and a polymer electrolyte membrane less susceptible to thickness reduction can be obtained.

The non-sulfonated aromatic polyether sulfone block copolymer that can be used in the present invention is preferably prepared by the following process according to the present invention. That is, an aromatic polyether sulfone block copolymer having no bonding group of a different kind in the molecular chain thereof can be prepared at low cost by a process of producing an aromatic polyether sulfone block copolymer comprising (a) a segment represented by chemical formula (10) shown below and (b) a segment represented by chemical formula (11) shown below, characterized by comprising allowing (A) an aromatic polyether sulfone prepolymer having the segment (a) and (B) a prepolymer having the segment (b) and having at least one terminal hydroxyl group in the form of an alkali metal salt to react with each other in a solution.

Chemical Formula (10)

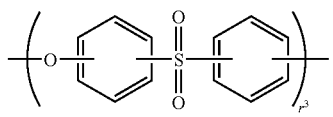

wherein $r^3$ represents an integer of 5 to 1500.

Chemical Formula (11)

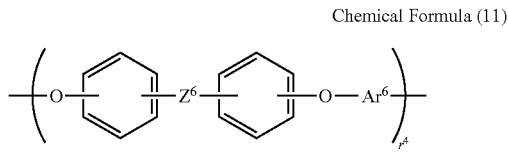

wherein $Z^6$ represents C=O or O=S=O; $Ar^6$ represents a divalent aromatic group composed of an aromatic ring that is not bonded to an electron attractive group; and $r^4$ represents an integer of 5 to 300.

The aromatic polyether sulfone prepolymer (A) is prepared by nucleophilic substitution between a dihydric phenol dialkali metal salt and an aromatic dihalide as disclosed, e.g., in R. N. Johnson et al., J. Polym. Sci., A-1, vol. 5, 2375 (1967) and JP-B-46-21458.

The dihydric phenol includes bis(4-hydroxyphenyl)sulfone, and the alkali metal includes sodium and potassium.

The aromatic dihalide includes chlorosulfones, such as bis(4-chlorophenyl)sulfone, bis(2-chlorophenyl)sulfone, bis(2-methyl-4-chlorophenyl)sulfone, and bis(3,5-dimethyl-4-chlorophenyl)sulfone.

In chemical formula (10), $r^3$ is an integer of 5 to 1500, preferably an integer of 5 to 1000.

The prepolymer (A) may be a commercially available one, such as SUMIKAEXCEL (registered trademark) from Sumitomo Chemical Co., Ltd. and ULTRASON (registered trademark) from BASF.

Synthesis of the prepolymer (B) is known. The prepolymer (B) is synthesized by the reaction between an aromatic dihalide and excess of a dihydric phenol dialkali metal salt in the same manner as for the aromatic polyether sulfone represented by chemical formula (10).

The dihydric phenol used above is one having no electron attractive group bonded to its aromatic ring, such as hydroquinone, resorcinol, 1,5-dihydroxynaphthalene, 1,6-dihydroxynaphthalene, 1,7-dihydroxynaphthalene, 2,7-dihydroxynaphthalene, 4,4'-biphenol, 2,2'-biphenol, bis(4-hydroxyphenyl)ether, bis(2-hydroxyphenyl)ether, 2,2-bis(4-hydroxyphenyl)propane, 2,2-bis(3-methyl-4-hydroxyphenyl)propane, 2,2-bis(3,5-dimethyl-4-hydroxyphenyl)propane, bis-(4-hydroxyphenyl)methane, 2,2-bis(3,5-dimethyl-4-hydroxyphenyl)hexafluoropropane, and 9,9-bis(4-hydroxyphenyl)fluorene. These compounds can be used either individually or as a combination of two or more thereof.

The alkali metal includes sodium and potassium.

The aromatic dihalide includes chlorosulfones, such as bis(4-chlorophenyl)sulfone, bis(2-chlorophenyl)sulfone, bis(2-methyl-4-chlorophenyl)sulfone, and bis(3,5-dimethyl-4-chlorophenyl)sulfone, and bis(4-chlorophenyl)ketone.

Synthesis of the prepolymer (B) using bis(4-chlorophenyl)ketone is carried out in the same manner as in the synthesis using the chlorosulfone as taught, e.g., in JP-A-10-120743.

In chemical formula (11), $r^4$ is an integer of 5 to 300, preferably an integer of 5 to 200.

The prepolymer (B) is also synthesized by allowing an aromatic polyether sulfone having a biphenyl structure that is sold under the trade name Radel (registered trademark) or an aromatic polysulfone marketed under the trade name Udel (registered trademark), both available from Solvay Advanced Polymers, or an aromatic polyether ketone marketed under the trade name Victrex (registered trademark) from Victrex-MC Inc. to react with the dihydric phenol alkali metal salt having no electron attracting group bonded to the aromatic ring thereof to give a prepolymer having a controlled molecular weight and a modified terminal group.

Synthesis of the block copolymer is conducted by mixing a solution of the prepolymer (A) and a solution of the prepolymer (B) to cause the prepolymers to react. The temperature of the mixture is preferably 120 to 200° C., still preferably 130 to 195° C., particularly preferably 140 to 190° C. At reaction temperatures lower than 120° C., the reaction hardly proceeds. At temperatures higher than 200° C., the ether exchange reaction tends to proceed excessively, resulting in formation of a random copolymer. The reaction time ranges from 15 minutes to 48 hours. With a shorter reaction time, the reaction tends to be insufficient. With a longer time, the ether exchange reaction tends to proceed excessively, resulting in formation of a random copolymer.

Each of the solutions of the prepolymers used in the block copolymer synthesis may be either the one as obtained in the prepolymer synthesis or one prepared by re-dissolving the prepolymer isolated from the synthesis system in a solvent.

Where the isolated prepolymer (B) is re-dissolved in a solvent, it is necessary to convert the hydroxyl group into an alkali metal salt.

The solvent which can be used for the block copolymer synthesis includes those capable of dissolving both the prepolymers, such as polar solvents, e.g., dimethyl sulfoxide, sulfolane, N-methyl-2-pyrrolidone, 1,3-dimethyl-2-imidazolidinone, N,N-dimethylformamide, N,N-dimethylacetamide, and diphenyl sulfone.

In the block copolymer synthesis, cases are sometimes met with in which the hydroxyl terminals in the form of an alkali metal salt are in excess over the halogen terminals, and the block copolymer hardly gains a desired molecular weight. In such cases, it is advisable that a requisite amount of bis(4-fluorophenyl)sulfone be added to the solution as obtained by the block copolymerization to cause the block copolymer to further react at 120 to 190° C. for 15 minutes to 48 hours to increase the molecular weight The amount of bis(4-fluorophenyl)sulfone to be added is nearly such as to counteract the imbalance of the terminal groups. For example, it is 1/5 or less of the mole number of the aromatic dihalide used in the synthesis of the prepolymer (B).

The manner of isolating the block copolymer from the resulting reaction solution is not particularly restricted. For instance, the reaction solution is poured into a poor solvent, such as water and an alcohol, to precipitate the block copolymer, or the residual and the produced inorganic salts are removed by filtration, and the solvent is removed from the filtrate by drying The non-sulfonated aromatic polyether sulfone block copolymer obtained by the above-described process of the invention preferably has a solution viscosity ($\eta_{sp/c}$) of 0.1 to 5.

The polymer electrolyte composition according to the present invention can contain a polystyrene polymer having a structural unit represented by chemical formula (12) shown below and/or a structural unit represented by chemical formula (13) shown below in place of the "aromatic polymer having a carbonyl bond and/or a sulfonyl bond in the main chain thereof and containing a cation exchange group".

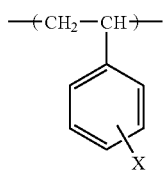

Chemical Formula (12)

wherein X represents a cation exchange group.

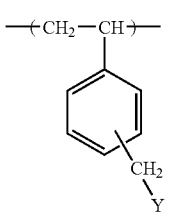

Chemical Formula (13)

wherein Y represents a cation exchange group.

The polystyrene polymer having a structural unit represented by chemical formula (12) and/or a structural unit represented by chemical formula (13) may be either a homopolymer or a copolymer having one or more other repeating units.

The polystyrene polymer having a structural unit represented by chemical formula (12) and/or a structural unit represented by chemical formula (13) can be synthesized by, for example, (1) a process in which a monomer containing a cation exchange group is polymerized or (2) a process in which a cation exchange group is introduced into a previously prepared polymer. The copolymer may be either a block copolymer or a random copolymer. The cation exchange group includes a sulfonic acid group, a carboxyl group, and a phosphonic acid group.

A polystyrene polymer having a structural unit represented by chemical formula (12) wherein the cation exchange group is a sulfonic acid group, for example, can be obtained by homopolymerizing styrenesulfonic acid or a salt thereof or copolymerizing styrenesulfonic acid or a salt thereof with a comonomer. The one wherein the cation exchange group is a carboxyl group can be obtained by homopolymerizing vinylbenzoic acid or a salt thereof or copolymerizing vinylbenzoic acid or a salt thereof with a comonomer.

A polystyrene polymer having a structural unit represented by chemical formula (13) can be obtained by homopolymerizing, for example, vinylbenzylsulfonic acid or a salt thereof or copolymerizing the same with a comonomer.

The copolymerizable comonomers are not particularly limited and include aromatic compounds, such as styrene and α-methylstyrene, acrylic or methacrylic esters, such as methyl acrylate, ethyl acrylate, methyl methacrylate, and ethyl methacrylate, and aliphatic conjugated dienes, such as butadiene and isoprene. A copolymer with an aliphatic conjugated diene may have the unsaturated bonds in the main chain thereof saturated by hydrogenation.

The method for introducing a cation exchange group into a previously synthesized polymer is not particularly limited, and known methods can be used. For example, a polystyrene polymer having a sulfonic acid group-containing structural unit of chemical formula (12) can be obtained by introducing a sulfonic acid group into a previously synthesized polymer. This can be done by, for example, reacting polystyrene or a copolymer having a styrene unit with a known sulfonating agent, such as sulfuric acid, fuming sulfuric acid, chlorosulfonic acid or acetyl sulfate.

For example, JP-T-2002-509152 and European Polymer Journal, vol. 36, 61 (2000) disclose a process in which acetyl sulfate prepared from concentrated sulfuric acid and acetic anhydride is used to introduce a sulfonic acid group into a styrene-(ethylene-butylene)-styrene triblock copolymer or a styrene-(ethylene-propylene) block copolymer.

The process of producing a polystyrene polymer having a carboxyl group-containing structural unit of chemical formula (12) by introducing a carboxyl group into a previously prepared polymer includes a process comprising acetylating previously prepared polystyrene or copolymer having a styrene unit through Friedel-Crafts reaction and oxidizing the acetyl group with an oxidizing agent.

For example, Macromolecules, vol. 28, 8702 (1995) and European Polymer Journal, vol. 36, 61 (2000) teach a process including acetylating a styrene-(ethylene-butylene)-styrene triblock copolymer or a styrene-(ethylene-propylene) block copolymer with acetyl chloride, etc. and oxidizing the acetyl group with an oxidizing agent, e.g., sodium hypochlorite, to introduce a carboxyl group.

A polystyrene polymer having a sulfonic acid group-containing structural unit of chemical formula (13) can also be obtained by a process including chloromethylating previously prepared polystyrene or a previously prepared copolymer having a styrene unit with chloromethyl methyl ether and allowing the polymer to react with sodium sulfite to introduce a sulfonic acid group into the polymer. A polystyrene polymer having a sulfonic acid group-containing structural unit of chemical formula (13) can also be obtained by allowing chloromethylated polystyrene synthesized by homopolymerization of chloromethylstyrene or a copolymer having a chloromethylated styrene unit synthesized by copolymerizing chloromethylstyrene and other monomer(s) to react with sodium sulfite to introduce a sulfonic acid group into the polymer.

A polystyrene polymer having a phosphonic acid group-containing structural unit represented by chemical formula (13) can be obtained by applying the process described in JP-A-2000-11755. That is, the polymer is obtained by chloromethylating previously synthesized polystyrene or copolymer having a styrene unit with chloromethyl methyl ether, allowing the chloromethylated polymer to react with triethyl phosphite, and hydrolyzing the product. A polystyrene polymer having a phosphonic acid group-containing structural unit of chemical formula (13) can also be obtained by allowing chloromethylated polystyrene obtained by homopolymerization of chloromethylstyrene or a copolymer having a chloromethylated styrene unit obtained by copolymerizing chloromethylstyrene with other monomer(s) to react with triethyl phosphite and hydrolyzing the product.

The previously synthesized polymer may be either a homopolymer of styrene or chloromethylstyrene or a copolymer of the same with one or more other monomers. The other monomers providing the constituent unit of the copolymer are not particularly limited and include aromatic compounds, such as styrene and α-methylstyrene, acrylic or methacrylic esters, such as methyl acrylate, ethyl acrylate, methyl methacrylate, and ethyl methacrylate, and aliphatic conjugated dienes, such as butadiene and isoprene. A copolymer with an aliphatic conjugated diene may have the unsaturated bonds in the main chain thereof saturated by hydrogenation.

The polystyrene polymer used in the present invention preferably has a weight average molecular weight of 10,000 to 2,000,000. With the weight average molecular weight smaller than the lower limit, the polymer electrolyte composition or the polymer electrolyte membrane will have reduced strength.

The polystyrene polymer used in the invention preferably has an ion exchange capacity of 0.3 to 7 meq/g. With an ion exchange capacity below the lower limit, the polymer is not sufficiently mixed with a molten salt (hereinafter described), and the resulting composition tends to suffer from bleeding out of the molten salt.

The molten salt which can be used in the present invention has a melting point of 100° C. or lower, preferably 80° C. or lower, still preferably 60° C. or lower. Known molten salts can be used. The molten salt is composed of a cation component and an anion component. Preferred molten salts include those that are liquid at room temperature, room-temperature molten salts, and ionic liquids.

The cation component composing the molten salt is preferably an ammonium ion in view of molten salt's stability and the like. Cations having the following structures can be mentioned as examples. Cations having a cyclic structure preferably include those having an imidazole ring, a triazole ring, a pyrrolidine ring, a pyridine ring, a cyclohexane ring or a benzene ring. Each of these rings may be substituted. Cations having a straight-chain or branched alkyl group preferably include those having an alkyl group containing 1 to 10 carbon atoms, e.g., methyl, ethyl, propyl, isopropyl, n-butyl, isobutyl, sec-butyl, tert-butyl, pentyl or hexyl.

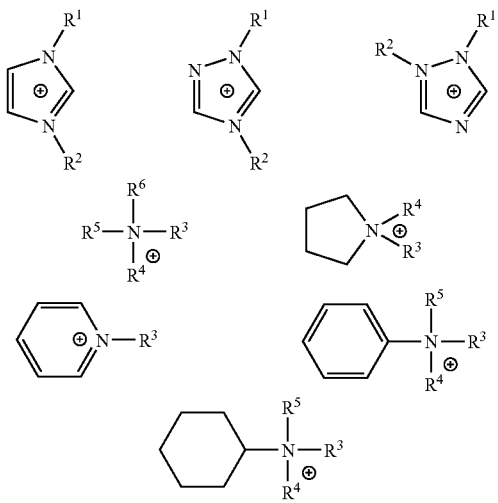

wherein $R^1$, $R^2$, $R^3$, $R^4$, $R^5$, and $R^6$ each represent a hydrogen atom or an alkyl group having 1 to 10 carbon atoms; and the rings may have a substituent other than hydrogen on their ring-forming carbon atoms.

The anion component composing the molten salt preferably includes sulfonic acid, a sulfonic acid compound, a carboxylic acid, and an inorganic acid. Specific examples are $(CF_3SO_2)_3C^-$, $(CF_3SO_2)_2N^-$, $CF_3SO_3^-$, $C_4F_9SO_3^-$, $CF_3CO_2^-$, $C_3F_7CO_2^-$, $BF_4^-$, $PF_6^-$, $ClO_4^-$, $CH_3CO_2^-$, $NO_3^-$, $NO_2^-$, $HSO_3^-$, and halide ions.

Methods for synthesizing molten salts composed of the anion and cation components are already known. For example, the molten salts are synthesized by the methods described in Hiroyuki Ohno, Lithium Nijidenchino Gijyutukakushinto Syoraitenbo, NTS Inc., Tokyo, p. 79 (2001), R. Hagiwara et al., J. Fluorine Chem., vol. 105, 221 (2000), J. Sun et al., Electrochimica Acta., vol. 46, 1703 (2001), P. Bonhote et al., Inorg. Chem., vol. 35, 1168 (1996), and D. R. McFarlane et al., Electrochim. Acta., vol. 45, 1271 (2000).

More specifically, the molten salts are obtained by reacting a basic nitrogen-containing compound and/or a halogen salt thereof with an acid and/or a metal salt thereof.

Examples of preferred molten salts for use in the present invention are listed below.

Trifluoromethanesulfonates, including 1,3-dimethylimidazolium trifluoromethanesulfonate, 1,3-diethylimidazolium trifluoromethanesulfonate, 1,2-dimethylimidazolium trifluoromethanesulfonate, 1,2-diethylimidazolium trifluoromethanesulfonate, 1-ethyl-3-methylimidazolium trifluoromethanesulfonate, 1-methyl-3-propylimidazolium trifluoromethanesulfonate, 2-ethyl-1-methylimidazolium trifluoromethanesulfonate, 1-ethyl-2-methylimidazolium trifluoromethanesulfonate, 1,2,3-trimethylimidazolium trifluoromethanesulfonate, 1,2-dimethyl-3-propylimidazolium trifluoromethanesulfonate, 1-methylimidazolium trifluoromethanesulfonate, 1-ethylimidazolium trifluoromethanesulfonate, 1-vinylimidazolium trifluoromethanesulfonate, 2-methylimidazolium trifluoromethanesulfonate, 1-methylpyrrolidinium trifluoromethanesulfonate, and 2,4-lutidinium trifluoromethanesulfonate.

Trifluoroacetates such as 1,3-dimethylimidazolium trifluoroacetate and 1-ethyl-3-methylimidazolium trifluoroacetate.

Tetrafluoroborates, such as 1,3-dimethylimidazolium tetrafluoroborate, 1,3-diethylimidazolium tetrafluoroborate, 1,2-dimethylimidazolium tetrafluoroborate, 1,2-diethylimidazolium tetrafluoroborate, 1-ethyl-3-methylimidazolium tetrafluoroborate, 1-methyl-3-propylimidazolium tetrafluoroborate, 2-ethyl-1-methylimidazolium tetrafluoroborate, 1-ethyl-2-methylimidazolium tetrafluoroborate, 1,2,3-triethylimidazolium tetrafluoroborate, 1,2-dimethyl-3-propylimidazolium tetrafluoroborate, 1-methylimidazolium tetrafluoroborate, 1-ethylimidazolium tetrafluoroborate, 1-vinylimidazolium tetrafluoroborate, 2-methylimidazolium tetrafluoroborate, 1-methylpyrrolidinium tetrafluoroborate, 2,4-lutidinium tetrafluoroborate, and 1-butylpyridinium tetrafluoroborate.

Hexafluorophosphates, such as 1,3-dimethylimidazolium hexafluorophosphate and 1-butyl-3-methylimidazolium hexafluorophosphate.

Tris(trifluoromethylsulfonyl)methides, such as 1,3-dimethylimidazolium tris(trifluoromethylsulfonyl)methide, 1,3-diethylimidazolium tris-(trifluoromethylsulfonyl)methide, 1,2-dimethylimidazolium tris-(trifluoromethylsulfonyl)methide, 1,2-diethylimidazolium tris(trifluoromethylsulfonyl)methide, 1-ethyl-3-methylimidazolium tris(trifluoromethylsulfonyl)methide, 1-methyl-3-propylimidazolium tris(trifluoromethylsulfonyl)methide, 2-ethyl-1-methylimidazolium tris(trifluoromethylsulfonyl)methide, 1-ethyl-2-methylimidazolium tris(trifluoromethylsulfonyl)methide, 1,2,3-trimethylimidazolium tris-(trifluoromethylsulfonyl)methide, 1,2-dimethyl-3-propylimidazolium tris-(trifluoromethylsulfonyl)methide, 1-methylimidazolium tris(trifluoromethylsulfonyl)-methide, and 2-methylimidazolium tris(trifluoromethylsulfonyl)methide.

Methanesulfonates, such as 1,3-dimethylimidazolium methanesulfonate, 1-methylimidazolium methanesulfonate, 1-ethylimidazolium methanesulfonate, and 1-vinylimidazolium methanesulfonate.

Acetates, such as 1,3-dimethylimidazolium acetate, 1-ethyl-3-methylimidazolium acetate, 1-methylimidazolium acetate, and 1-ethylimidazolium acetate.

Nitrates, such as 1,3-dimethylimidazolium nitrate, 1-ethyl-3-methylimidazolium nitrate, 1-methylimidazolium nitrate, 1-ethylimidazolium nitrate, and 1-vinylimidazolium nitrate.

Nitrites, such as 1,3-dimethylimidazolium nitrite and 1-ethyl-3-methylimidazolium nitrite.

Sulfites, such as 1,3-dimethylimidazolium sulfite, 1-methylimidazolium sulfite, 1-ethylimidazolium sulfite, and 1-vinylimidazolium sulfite.

Chlorides, such as 1,3-dimethylimidazolium chloride, 1-ethyl-3-methylimidazolium chloride, 1-methylimidazolium chloride, 1-ethylimidazolium chloride, 1-vinylimidazolium chloride, 1,2-dimethyl-1,2,4-triazolium chloride, and 1-butylpyridinium chloride.

Bromides, such as 1,3-dimethylimidazolium bromide, 1-ethyl-3-methylimidazolium bromide, 1-methylimidazolium bromide, 1-ethylimidazolium bromide, 1-vinylimidazolium bromide, and 1-butylpyridinium bromide.

Bis(trifluoromethylsulfonyl)imides, such as 1,3-dimethylimidazolium bis(trifluoromethylsulfonyl)imide, 1,3-diethylimidazolium bis(trifluoromethylsulfonyl)-imide, 1,2-dimethylimidazolium bis(trifluoromethylsulfonyl)imide, 1,2-diethylimidazolium bis(trifluoromethylsulfonyl)imide, 1-ethyl-3-methylimidazolium bis(trifluoromethylsulfonyl) imide, 1-methyl-3-propylimidazolium bis-(trifluoromethylsulfonyl)imide, 2-ethyl-1-methylimidazolium bis-(trifluoromethylsulfonyl)imide, 1-ethyl-2-methylimidazolium bis-(trifluoromethylsulfonyl)imide, 1,2,3-trimethylimidazolium bis-(trifluoromethylsulfonyl)imide, 1,2-dimethyl-3-propylimidazolium bis-(trifluoromethylsulfonyl)imide, 1-methylimidazolium bis(trifluoromethylsulfonyl)-imide, 1-ethylimidazolium bis(trifluoromethylsulfonyl)imide, 1-vinylimidazolium bis(trifluoromethylsulfonyl)imide, and 2-methylimidazolium bis-(trifluoromethylsulfonyl)imide.

Of these molten salts, imidazolium salts are preferred for their low viscosity at room temperature. Specifically, 1-ethyl-3-methylimidazolium trifluoromethanesulfonate, 1-ethyl-3-methylimidazolium tetrafluoroborate, 1-ethyl-3-methylimidazolium bis(trifluoromethylsulfonyl)imide, 1-ethyl-3-methylimidazolium acetate, 1-ethylimidazolium trifluoromethanesulfonate, 1-ethylimidazolium tetrafluoroborate, 1-ethylimidazolium nitrate, 1-ethylimidazolium bis (trifluoromethylsulfonyl)imide, and the like are preferred.

The polymer electrolyte composition of the present invention can be produced by (1) dissolving predetermined amounts of the aromatic polymer and the molten salt in a solvent capable of dissolving both and drying the solution to remove the solvent or (2) immersing a molded article of the aromatic polymer in the molten salt to impregnate the aromatic polymer with the molten salt.

The molten salt in (2) above may be in the form of a solution in a solvent incapable of dissolving the aromatic polymer. In this case, impregnation of the aromatic polymer with the molten salt solution is followed by solvent removal by drying thereby to produce the polymer electrolyte composition.

The drying temperature for solvent removal in (1) and (2) above is not particularly limited as long as it is between the boiling point of the solvent and the decomposition temperatures of the cation exchange group-containing aromatic polymer and the molten salt. For example, where the aromatic polymer is an aromatic polyether sulfone, drying is carried out at a temperature of 0 to 200° C. The drying for solvent removal may be conducted under reduced pressure. If sufficient for solvent removal, the drying time is not particularly limited. For example, the drying is preferably continued for 2 to 100 hours.

The polymer electrolyte membrane of the present invention can be produced by (1) dissolving predetermined amounts of the aromatic polymer and the molten salt in a solvent capable of dissolving both, casting the solution, and removing the solvent by drying or (2) immersing a molded article of the aromatic polymer in the molten salt to impregnate the aromatic polymer with the molten salt.

The molten salt in (2) above may be in the form of a solution in a solvent incapable of dissolving the aromatic polymer. In this case, impregnation of the aromatic polymer with the molten salt solution is followed by solvent removal by drying thereby to produce the polymer electrolyte membrane.

The drying temperature for solvent removal in (1) and (2) above is not particularly limited as long as it is between the boiling point of the solvent and the decomposition temperatures of the cation exchange group-containing aromatic polymer and the molten salt. For example, where the aromatic polymer is an aromatic polyether sulfone, drying is carried out at a temperature of 0 to 200° C. The drying for solvent removal may be conducted under reduced pressure. If sufficient for solvent removal, the drying time is not particularly limited. For example, the drying is preferably continued for 2 to 100 hours.

A preferred weight fraction of the molten salt in the polymer electrolyte composition of the invention is in the range of 3 to 90% by weight, particularly 5 to 80% by weight. With a higher amount of the molten salt, the composition may fail to retain its shape, e.g., a film shape after molding, or the molten salt tends to bleed out. With a lower amount of the molten salt, the composition will have reduced ionic conductivity.

Similarly, a preferred weight fraction of the molten salt in the polymer electrolyte membrane of the invention is in the range of 3 to 90% by weight, particularly 5 to 80% by weight. With a higher amount of the molten salt, the membrane may fail to retain its shape, or the molten salt tends to bleed out. With a lower amount of the molten salt, the composition will have reduced ionic conductivity.

The solvent used to dissolve both the aromatic polymer and the molten salt is not particularly limited. Basically, any solvent capable of dissolving them can be used, including amides, sulfones, alcohols, and ethers. Examples of suitable solvents are water, N,N-dimethylformamide, N,N-dimethylacetamide, N-methyl-2-pyrrolidone, 1,3-dimethyl-2-imidazolidinone, dimethyl sulfoxide, sulfolane, diphenyl sulfone, methanol, ethanol, isopropyl alcohol, ethylene glycol monomethyl ether, ethylene glycol monoethyl ether, propylene glycol monomethyl ether, diethyl ether, acetone, and tetrahydrofuran. Preferred are those which can be removed by drying at temperatures not higher than the decomposition temperatures of the aromatic polymer and the molten salt.

The molded articles made of the cation exchange group-containing aromatic polymer include membranes, fibers, nonwoven fabrics, fillers, and porous films.

When the molded article is immersed in and impregnated with the molten salt, the immersion temperature is not limited as long as it ranges from the melting point of the molten salt up to the melting or decomposition temperature of the cation exchange group-containing aromatic polymer or from the melting point to the decomposition temperature of the molten salt. For example, in using the aromatic polyether sulfone or the aromatic polyether ketone as the aromatic polymer, the immersion is carried out at a temperature of 0 to 250° C. In using the polystyrene polymer as the aromatic polymer, the immersion is conducted at 0 to 200° C.

If necessary, a part or all of the cation exchange groups possessed by the aromatic polymer used in the present invention may be in the form of a metal salt, e.g., a sodium salt or a potassium salt. The molded article of the aromatic polymer may be reinforced by fiber, a porous film, etc. If desired, the polymer electrolyte composition of the invention may contain an inorganic acid, e.g., phosphoric acid, hypophosphorous acid or sulfuric acid, or a salt thereof; a perfluoroalkylsulfonic acid having 1 to 14 carbon atoms or a salt thereof; a perfluoroalkylcarboxylic acid having 1 to 14 carbon atoms or a salt thereof; an inorganic substance, such as platinum, silica gel, silica or zeolite; a tertiary amine compound, e.g., an imidazole compound, a pyridine compound or an aliphatic tertiary amine; an alkali metal salt, e.g., a lithium salt; or a polymer of different kind.

The present invention provides a desired polymer electrolyte composition having an ionic conductivity, e.g., of $10^{-4}$ $Scm^{-1}$ or higher at 150° C., especially at 100° C.

The present invention will now be illustrated in greater detail with reference to Examples and Comparative Examples. In Examples and Comparative Examples, measurements were made in accordance with the following methods.

1) Measurement of Reduced Viscosity $\eta_{sp/c}$ of Polyether Sulfone

Measurement was made on a 0.5 g/dl sample solution in N-methyl-2-pyrrolidone at 25° C. with a Ubbellohde viscometer. The reduced viscosity was calculated according to equation (1):

$$\eta_{sp/c} = \frac{t_s - t_0}{t_0} \cdot \frac{1}{c} \quad (1)$$

wherein $t_s$ is a solution flow time; $t_0$ is a solvent flow time; and c is a solution concentration.

2) Measurement of Ionic Conductivity

A membrane having been vacuum dried at 60° C. for 16 hours was sandwiched between stainless steel plates having a radius of 0.65 cm and put into a closed container. The ionic conductivity was obtained by complex impedance measurement with 3532 LCR Hi-Tester supplied by Hioki E.E. Corp. in a thermostat set at a prescribed temperature.

3) Measurement of Ion Exchange Capacity

A sample was stirred in a 0.01N sodium hydroxide aqueous solution at room temperature for 16 hours, followed by filtration The filtrate was titrated with a 0.01N hydrochloric acid aqueous solution to obtain the amount of consumed sodium hydroxide, from which the ion exchange capacity was calculated.

4) Transmission Electron Microscopic Observation

A membrane was sliced in the thickness direction, and the slice was observed under JEM 200CX supplied from JEOL Ltd. at a magnification of 90000 times.

5) Melting Point

Measured in a helium stream at a rate of temperature rise of 10° C./min with DSC-7 supplied by Perkin Elmer Inc.

6) Thermogravimetry

Measurement was made in air at a rate of temperature rise of 10° C./min with TGA-50 supplied by Shimadzu Corp.

SYNTHESIS EXAMPLE 1

Synthesis of Sulfonic Acid Group-Containing Aromatic Polyether Sulfone Random Copolymer (RPS-1)

To a mixture of 51.4 g of bis(4-fluorophenyl)sulfone, 25 g of bis(4-hydroxyphenyl)sulfone, 18.9 g of 4,4'-biphenol, and 36 g of potassium carbonate were added 300 ml of N,N-dimethylacetamide and 200 ml of toluene, and the mixture was heated while stirring in a nitrogen stream. The temperature was elevated up to 165° C. while removing produced water together with toluene. The stirring was continued for 3 hours at that temperature. The solution was poured into a large quantity of water to precipitate a white solid, which was collected by filtration, washed twice with hot water and once with methanol, and dried under reduced pressure to give copolymer RP-1. The solution viscosity $\eta_{sp/c}$ of the resulting polymer was 0.55.

Ten gram of copolymer RP-1 prepared above was dissolved in 100 ml of 98% sulfuric acid, and the solution was stirred at room temperature for 24 hours. The solution was poured into a large amount of water. The precipitated white solid was separated by filtration, washed twice with hot water and once with methanol, and dried under reduced pressure to give copolymer RPS-1. The resulting polymer had an ion exchange capacity of 1.73 mmol/g. A solution of the polymer in N,N-dimethylacetamide was cast and dried to form a membrane. TEM observation of the membrane revealed no phase separation structure, proving the polymer to be a random copolymer.

SYNTHESIS EXAMPLE 2

Synthesis of Sulfonic Acid Group-Containing Aromatic Polyether Sulfone Block Copolymer (BPS-1)

In a four-necked flask equipped with a stirrer, a water content meter, a thermometer, and a nitrogen inlet were put 51.4 g of bis(4-fluorophenyl)sulfone, 50 g of bis(4-hydroxyphenyl)sulfone, and 36 g of potassium carbonate. To the mixture were added 300 ml of N,N-dimethylacetamide and 200 ml of toluene, and the mixture was heated while stirring in a nitrogen stream. The temperature was elevated up to 165° C. while removing produced water together with toluene. The stirring was continued for 3 hours at that temperature. The solution was poured into a large quantity of water to precipitate a white solid, which was collected by filtration, washed twice with hot water and once with methanol and dried under reduced pressure to give hydrophobic segment prepolymer a1. The solution viscosity $\eta_{sp/c}$ of the resulting polymer was 0.42.

To a mixture of 25.7 g of bis(4-fluorophenyl)sulfone, 18.9 g of 4,4'-biphenol, and 18 g of potassium carbonate were added 150 ml of N,N-dimethylacetamide and 100 ml of toluene. The mixture was heated with stirring in a nitrogen stream up to 165° C. while removing produced water together with toluene. The stirring was continued at that temperature for 3 hours to prepare polymer b1 solution. Separately, 42.6 g of hydrophobic segment prepolymer a1 and 0.5 g of potassium carbonate were added to a mixture of 150 ml of N,N-dimethylacetamide and 100 ml of toluene, and the mixture was heated in a nitrogen stream up to 165° C. while removing produced water together with toluene to prepare a solution of a potassium salt of polymer a1. The solution of the hydrophobic segment prepolymer a1 potassium salt was added to the polymer b1 solution, and the mixture was stirred at 160° C. for 1 hour. The mixed solution was poured into a large amount of water to precipitate a white solid. The solid was collected by filtration, washed twice with hot water and once with methanol, and dried in vacuo to obtain copolymer BP-1. The resulting polymer had a solution viscosity $\eta_{sp/c}$ of 0.63.

Ten grams of copolymer BP-1 was dissolved in 100 ml of 98% sulfuric acid. The solution was stirred at room temperature for 24 hours, followed by pouring into a large quantity of water. The white solid thus precipitated was separated by filtration, washed twice with hot water and once with methanol, and vacuum dried to yield polymer BPS-1. The resulting polymer had an ion exchange capacity of 1.78 mmol/g. The hydrophilic segment weight fraction was 0.49 as calculated by $^1$H-NMR analysis. A membrane prepared by casting a solution of polymer BPS-1 in N,N-dimethylacetamide and drying revealed a phase separation structure under TEM observation, proving that the polymer to be a block copolymer.

SYNTHESIS EXAMPLE 3

Synthesis of Sulfonic Acid Group-Containing Aromatic Polyether Sulfone Block Copolymer (BPS-2)

In a four-necked flask equipped with a stirrer, a water content meter, a thermometer, and a nitrogen inlet were put 75.5 g (0.263 mol) of bis(4-chlorophenyl)sulfone, 50 g (0.269 mol) of 4,4'-biphenol, and 48 g of potassium carbonate. To the mixture were added 400 ml of dimethyl sulfoxide and 50 ml of toluene, and the mixture was heated while stirring in a nitrogen stream. The temperature was elevated up to 180° C. while removing produced water together with toluene. The stirring was continued for 3 hours at that temperature to prepare a solution of polymer b2 (prepolymer (B)). The number of the repeating units of polymer b2, $r^4$, was about 44 as calculated from the feed ratio.

Separately, 160.9 g of SUMIKAEXCEL 4100G (Sumitomo Chemical Co., Ltd.) having the structural unit shown below was dissolved in 480 ml of dimethyl sulfoxide to prepare a solution of a prepolymer (A). The number of the repeating units, $r^3$, of the polymer was about 78 as obtained by $^1$H-NMR analysis.

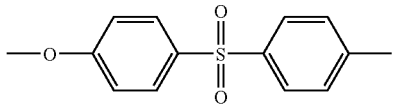

The resulting solution was added to the polymer b2 solution, and the mixed solution was stirred at 170° C. for 1.5 hours, followed by pouring into a large quantity of water. The white solid thus precipitated was recovered by filtration, washed twice with hot water and once with methanol, and dried under reduced pressure to give copolymer BP-2. The solution viscosity $\eta_{sp/c}$ of the resulting polymer was 0.43.

Ten grams of copolymer BP-2 was dissolved in 100 ml of 98% sulfuric acid, followed by stirring at room temperature for 24 hours thereby to sulfonate the component derived from polymer b2 (prepolymer (B)). The solution was put into a large quantity of water to precipitate a white solid. The solid was separated by filtration, washed twice with hot water and once with methanol, and dried under reduced pressure to give polymer BPS-2. The resulting polymer had an ion exchange capacity of 1.63 mmol/g, which indicates that the sulfonated component based on polymer b2 (prepolymer (B)) was not dissolved and removed by washing with hot water and that polymer b2 had reacted with the prepolymer (A). A membrane prepared by casting a solution of polymer BPS-2 in N,N-dimethylacetamide and drying the cast film revealed a phase separation structure under TEM observation, proving that the polymer to be a block copolymer.

SYNTHESIS EXAMPLE 4

Synthesis of Sulfonic Acid Group-Containing Aromatic Polyether Sulfone Block Copolymer (BPS-3)

In a four-necked flask equipped with a stirrer, a water content meter, a thermometer, and a nitrogen inlet were put 42.7 g (0.149 mol) of bis(4-chlorophenyl)sulfone, 28.2 g (0.151 mol) of 4,4'-biphenol, and 27.2 g of potassium carbonate. To the mixture were added 240 ml of dimethyl sulfoxide and 30 ml of toluene, and the mixture was heated while stirring in a nitrogen stream. The temperature was elevated up to 180° C. while removing produced water together with toluene. The stirring was continued for 3 hours at that temperature to prepare a solution of polymer b3 (prepolymer (B)). The number of the repeating units of polymer b3, $r^4$, was about 55 as calculated from the feed ratio.

Separately, 115 g of SUMIKAEXCEL 4100G (available from Sumitomo Chemical Co., Ltd.; repeating unit number $r^3$=ca. 78) was dissolved in 345 ml of dimethyl sulfoxide, and the resulting solution was added to the polymer b3 solution. The mixed solution was stirred at 170° C. for 1.5 hours, followed by pouring into a large quantity of water. The white solid thus precipitated was recovered by filtration, washed twice with hot water and once with methanol, and dried under reduced pressure to give copolymer BP-3. The solution viscosity $\eta_{sp/c}$ of the resulting polymer was 0.46.

Ten grams of copolymer BP-3 was dissolved in 100 ml of 98% sulfuric acid, followed by stirring at room temperature for 24 hours thereby to sulfonate the component derived from polymer b3 (prepolymer (B)). The solution was put into a large quantity of water to precipitate a white solid. The solid was separated by filtration, washed twice with hot water and once with methanol, and dried under reduced pressure to give polymer BPS-3. The resulting polymer had an ion exchange capacity of 1.38 mmol/g, which indicates that the sulfonated component based on polymer b3 (prepolymer (B)) was not dissolved and removed by washing with hot water and that polymer b3 had reacted with the prepolymer (A). A membrane prepared by casting a solution of polymer BPS-3 in N,N-dimethylacetamide and drying the cast film revealed a phase separation structure under TEM observation, proving that the polymer to be a block copolymer.

SYNTHESIS EXAMPLE 5

Synthesis of Sulfonic Acid Group-Containing Aromatic Polyether Sulfone Block Copolymer (BPS4)

In the same manner as in Synthesis Example 3, a solution of polymer b4 (prepolymer (B)) and a dimethyl sulfoxide solution of SUMIKAEXCEL 4100G were prepared. The dimethyl sulfoxide solution of SUMIKAEXCEL was added to the polymer b4 solution, followed by stirring at 170° C. for 1.5 hours. To the solution was added 1.05 g ($4.1 \times 10^{-3}$ mol) of bis(4-fluorophenyl)sulfone, followed by stirring at 170° C.

for 1.5 hours. The solution was poured into a large amount of water to precipitate a white solid, which was collected by filtration, washed twice with hot water and once with methanol, and dried in vacuo to yield copolymer BP-4. The resulting polymer had a solution viscosity $\eta_{sp/c}$ of 0.58.

Ten grams of copolymer BP-4 was dissolved in 100 ml of 98% sulfuric acid, and the solution was stirred at room temperature for 24 hours to sulfonate the component derived from polymer b4 (prepolymer (B)). The solution was poured into a large amount of water. The white solid thus precipitated was separated by filtration, washed twice with hot water and once with methanol, and vacuum dried to yield polymer BPS-4. The resulting polymer had an ion exchange capacity of 1.67 mmol/g, which indicates that the sulfonated component based on polymer b4 (prepolymer (B)) was not dissolved and removed by washing with hot water and that polymer b4 had reacted with the prepolymer (A). A membrane prepared by casting a solution of polymer BPS-4 in N,N-dimethylacetamide and drying the cast film revealed a phase separation structure under TEM observation, proving that the polymer BPS-4 to be a block copolymer.

SYNTHESIS EXAMPLE 6

Synthesis of Aromatic Polyether Sulfone Random Copolymer and TEM Observation of a Sulfonation Product of the Copolymer In a four-necked flask equipped with a stirrer, a water content meter, a thermometer, and a nitrogen inlet were put 18.6 g of bis(4-chlorophenyl)sulfone, 4.5 g of 4,4'-biphenol, 10.1 g of bis(4-hydroxyphenyl)sulfone, and 11.8 g of potassium carbonate. To the mixture were added 50 ml of dimethyl sulfoxide and 25 ml of toluene, and the mixture was heated while stirring in a nitrogen stream. The temperature was raised to 195° C. while removing produced water together with toluene. The stirring was continued for 3 hours at that temperature to prepare a polymer solution. The solution was put into a large quantity of water. The white solid thus precipitated was recovered by filtration, washed twice with hot water and once with methanol, and dried under reduced pressure to give copolymer RP-2. The solution viscosity $\eta_{sp/c}$ of the resulting polymer was 0.52.

Five grams of copolymer RP-2 was dissolved in 50 ml of 98% sulfuric acid, followed by stirring at room temperature for 24 hours. The solution was poured into a large amount of water to precipitate a white solid. The solid was separated by filtration, washed twice with hot water and once with methanol, and dried under reduced pressure to give polymer RPS-2. By this treatment, only those aromatic rings with no electron attracting groups bonded thereto were selectively sulfonated as described, e.g., in JP-A-61-43630. The resulting polymer had an ion exchange capacity of 1.5 mmol/g. A membrane prepared by casting a solution of polymer RPS-2 in N,N-dimethylacetamide and drying the cast film showed a uniform structure under TEM observation. This provides confirmation that a block copolymer is not produced unless a prepolymer is used and that a sulfonated random copolymer reveals no phase separation structure.

SYNTHESIS EXAMPLE 7

Confirmation of Water Solubility of Sulfonated Prepolymer (B)

In a four-necked flask equipped with a stirrer, a water content meter, a thermometer, and a nitrogen inlet were put 7.71 g of bis(4-chlorophenyl)sulfone, 5 g of 4,4'-biphenol, and 4.9 g of potassium carbonate. To the mixture were added 50 ml of dimethyl sulfoxide and 25 ml of toluene, and the mixture was heated while stirring in a nitrogen stream. The temperature was increased up to 180° C. while removing produced water together with toluene. The stirring was continued for 3 hours at that temperature to prepare a polymer solution. The solution was poured into a large quantity of water. The white solid thus precipitated was recovered by filtration, washed twice with hot water and once with methanol, and dried under reduced pressure to give polymer HP-1. Polymer HP-1 structurally corresponds to the prepolymers (B) in Synthesis Examples 3 to 5. The solution viscosity $\eta_{sp/c}$ of polymer HP-1 was 0.41.

Five grams of polymer HP-1 was dissolved in 50 ml of 98% sulfuric acid, followed by stirring at room temperature for 24 hours. The solution was put into a large quantity of water, but no precipitate was formed. The solution was poured into a 1N hydrochloric acid aqueous solution to form a precipitate, which was washed with acetone three times and dried under reduced pressure. The resulting solid also dissolved in water. From these results it was confirmed that the resulting polymer HPS-1 was water soluble and that, when the segment (of the block copolymer) derived from the prepolymer (B) was a homopolymer, a sulfonation product of the segment was removed during the step of washing with water.

SYNTHESIS EXAMPLE 8

Synthesis of Sulfonic Acid Group-Containing Polyether Ether Ketone

In 100 ml of 98% sulfuric acid was dissolved 10 g of a commercially available poly(oxy-1,4-phenyleneoxy-1,4-phenylenecarbonyl-1,4-phenylene) (weight average molecular weight: ca. 20,800; number average molecular weight: 10,300; melting point: 322° C.) (polyether ether ketone). The solution was stirred at room temperature for 45 hours and then poured into a large amount of water to precipitate a white solid. The solid was separated by filtration, washed with a large quantity of water until the washing became neutral, and dried under reduced pressure to give a sulfonic acid group-containing polyether ether ketone. The resulting polymer had an ion exchange capacity of 1.54 mmol/g.

SYNTHESIS EXAMPLE 9

Synthesis of Carboxyl Group-Containing Aromatic Polyether Sulfone

In a four-necked flask equipped with a stirrer, a water content meter, a thermometer, and a nitrogen inlet were put 15 g of 4,4'-bis(p-hydroxyphenyl)valeric acid, 13 g of potassium carbonate, 250 ml of dimethyl sulfoxide, and 90 ml of toluene, followed by heating while stirring in a nitrogen stream. The temperature was elevated up to 150° C. while removing produced water together with toluene. The stirring was continued for 3 hours at that temperature. To the system was further added 15 g of 4,4'-dichlorodiphenyl sulfone, and the temperature was raised to 185° C. while removing toluene, at which temperature the mixture was stirred for 16 hours. Potassium chloride thus precipitated was removed by filtration, and the filtrate was poured into a large quantity of diluted hydrochloric acid to precipitate a white solid. The solid was collected by filtration, washed with methanol repeatedly, and dried under reduced pressure to give a carboxyl-containing aromatic polyether sulfone. In the $^1$H-NMR spectrum measured on the resulting polymer, the signals at 7.906 ppm (d) and 7.100 ppm (d) were assigned to the protons of the phenyl rings originated in 4,4'-dichlorodiphenyl sulfone, the signals at 7.262 ppm (d) and 7.039 ppm (d) were attributed to the protons of the phenyl rings originated in 4,4'-bis(p-hydroxyphenyl)valeric acid, signals at 2.382 ppm to 2.367 ppm (t) corresponded to the methylene groups next to the carboxyl groups originated in 4,4'-bis(p-hydroxyphenyl)valeric acid, those at 2.047 ppm to 2.026 ppm (t) were assigned to the adjacent methylene groups, and the peak at 1.597 ppm (s) was attributed to the protons of the methyl groups. The ion exchange capacity was 2.00 mmol/g, calculated from the integral intensity ratio of the protons of the methylene groups next to the carboxyl groups and the protons of the phenyl rings originated in 4,4'-dichlorodiphenyl sulfone.

SYNTHESIS EXAMPLE 10

Synthesis of N-ethylimidazole trifluoromethanesulfonate

Twenty-five grams of trifluoromethanesulfonic acid was added dropwise to a solution of 16 g of N-ethylimidazole in 20 ml of ethanol at 0° C. The solution was returned to room temperature, stirred overnight, and dried in vacuo at 60° C. for 16 hours to give N-ethylimidazole trifluoromethanesulfonate (EtIm+TfS−) as a colorless transparent liquid. The resulting salt had a melting point of 8.3° C. (literature value: 7.8° C.).

SYNTHESIS EXAMPLE 11

Synthesis of 2,4-lutidine trifluoromethanesulfonate

Eight-point-five grams of trifluoromethanesulfonic acid was added dropwise to a solution of 6.1 g of 2,4-lutidine in 15 ml of ethanol at 0° C. The solution was returned to room temperature, stirred overnight, and dried in vacuo at 60° C. for 16 hours to yield 2,4-lutidine trifluoromethanesulfonate (Lut+TfS−) as a colorless transparent liquid. The resulting salt had a melting point of 64.9° C.

SYNTHESIS EXAMPLE 12

Synthesis of 1-methylpyrrolidine trifluoromethanesulfonate

Twenty-five grams of trifluoromethanesulfonic acid was added dropwise to a solution of 14.2 g of 1-methylpyrrolidine in 25 ml of ethanol at 0° C. The solution was returned to room temperature, stirred overnight, and dried in vacuo at 60° C. for 16 hours to furnish 1-methylpyrrolidine trifluoromethanesulfonate (MePy+TfS−) as a brown solid. The resulting salt had a melting point of 97.5° C.

SYNTHESIS EXAMPLE 13

Synthesis of N-ethylimidazole bis(trifluoromethylsulfonyl)imide

To 1.0 g of bis(trifluoromethylsulfonyl)imide was added dropwise 0.34 g of N-ethylimidazole in a nitrogen atmosphere in a glove box, and the solution was stirred overnight to obtain N-ethylimidazole bis(trifluoromethylsulfonyl)imide (EtIm+TFSI−) as a colorless transparent liquid. The resulting salt had a melting point of 6.6° C.

EXAMPLE 1

One-point-three grams of the sulfonic acid group-containing aromatic polyether sulfone random copolymer RPS-1 prepared in Synthesis Example 1 and 3 g of EtIm+TfS− obtained in Synthesis Example 10 were dissolved in 20 ml of N,N-dimethylacetamide. The solution was cast on a glass plate and dried in vacuo at 60° C. for 5 hours and 120° C. for 16 hours to obtain a transparent membrane. Even after the membrane was allowed to stand at 50° C. for one week, neither did EtIm+TfS− bleed out, nor was observed weight loss. The ionic conductivity of the membrane was as high as $2 \times 10^{-3}$ Scm$^{-1}$ at 100° C. in spite of the absence of water.

EXAMPLE 2

Three grams of the sulfonic acid group-containing aromatic polyether sulfone random copolymer RPS-1 synthesized in Synthesis Example 1 and 3 g of EtIm+TfS− obtained in Synthesis Example 10 were dissolved in 20 ml of N,N-dimethylacetamide. The solution was cast on a glass plate and dried in vacuo at 60° C. for 5 hours and 120° C. for 16 hours to obtain a transparent membrane having a thickness of 124 μm. Even when left to stand at 50° C. for one week, the membrane suffered from neither bleeding out of EtIm+TfS− nor weight loss. The ionic conductivity of the membrane was as high as $2 \times 10^{-3}$ Scm$^{-1}$ at 100° C. in spite of the absence of water. Although the membrane sandwiched between electrode plates was partly pressed out of the plate edges, and the part held between the plates was reduced in thickness to 60 μm, such was non-problematic for practical use.

EXAMPLE 3

Three grams of the sulfonic acid group-containing aromatic polyether sulfone block copolymer BPS-2 obtained in Synthesis Example 3 and 3 g of EtIm+TfS− synthesized in Synthesis Example 10 were dissolved in 20 ml of N,N-dimethylacetamide. The solution was cast on a glass plate and dried in vacuo at 60° C. for 5 hours and 120° C. for 16 hours to obtain a transparent membrane. Even after the membrane was left to stand at 50° C. for one week, neither did EtIm+ TfS− bleed out, nor was observed weight loss. The temperature dependence of the ionic conductivity of the resulting membrane is shown in FIG. 1. In spite of the absence of water, the ionic conductivity at 100° C. was as high as $1.2 \times 10^{-3}$ Scm$^{-1}$. The membrane retained its shape even after the measurement.

EXAMPLE 4

Three grams of the sulfonic acid group-containing aromatic polyether sulfone block copolymer BPS-1 prepared in Synthesis Example 2 and 5.5 g of EtIm+TfS− obtained in Synthesis Example 10 were dissolved in 20 ml of N,N-dimethylacetamide. The solution was cast on a glass plate and dried in vacuo at 60° C. for 5 hours and 120° C. for 16 hours to obtain a transparent membrane. Even after the membrane was left to stand at 50° C. for one week, neither did EtIm+ TfS− bleed out, nor was observed weight loss. In spite of the absence of water, the ionic conductivity of the membrane at 50° C. was as high as $1.2 \times 10^{-3}$ Scm$^{-1}$. The membrane retained its shape even after the measurement.

EXAMPLE 5

Three grams of the sulfonic acid group-containing aromatic polyether sulfone block copolymer BPS-2 prepared in Synthesis Example 3 and 12 g of EtIm+TfS− obtained in Synthesis Example 10 were dissolved in 20 ml of N,N-dimethylacetamide. The solution was cast on a glass plate and dried in vacuo at 60° C. for 5 hours and 120° C. for 16 hours to obtain a white turbid membrane. Even after the membrane was left to stand at 50° C. for one week, neither did EtIm+TfS− bleed out, nor was observed weight loss. In spite of the absence of water, the ionic conductivity of the membrane at 50° C. was as high as $6.2\times10^{-3}$ $Scm^{-1}$. The membrane retained its shape even after the measurement.

EXAMPLE 6

Three grams of the sulfonic acid group-containing aromatic polyether sulfone block copolymer BPS-2 prepared in Synthesis Example 3 was dissolved in 20 ml of N,N-dimethylacetamide. The solution was cast on a glass plate and dried in vacuo at 60° C. for 5 hours and 120° C. for 16 hours to obtain a transparent membrane. A 0.100 g portion of the resulting membrane was immersed in EtIm+TfS− obtained in Synthesis Example 10 at room temperature for 18 hours. The membrane was taken out of EtIm+TfS−, wiped to remove the attached EtIm+TfS− from both sides thereof, and weighed. The membrane showed 9.8% increase in weight over the dry weight before immersion, which was due to absorption of EtIm+TfS−. Even after the membrane was left to stand at 50° C. for one week, neither did EtIm+TfS− bleed out, nor was observed weight loss.

COMPARATIVE EXAMPLE 1

A membrane was prepared in the same manner as in Example 1, except for replacing the sulfonated aromatic polyether sulfone RPS-1 with the non-sulfonated aromatic polyether sulfone random copolymer RP-1 synthesized in Synthesis Example 1. The membrane after drying was white turbid, and EtIm+TfS- bled out of the membrane.

COMPARATIVE EXAMPLE 2

A membrane was prepared in the same manner as in Example 2, except for replacing the sulfonated aromatic polyether sulfone BPS-1 with the non-sulfonated aromatic polyether sulfone block copolymer BP-1 synthesized in Synthesis Example 2. The membrane after drying was white turbid, and EtIm+TfS− bled out of the membrane.

COMPARATIVE EXAMPLE 3

Three grams of the sulfonated aromatic polyether sulfone block copolymer BPS-1 obtained in Synthesis Example 2 and 3 g of N-ethylimidazole were dissolved in 20 ml of N,N-dimethylacetamide. A membrane was prepared in the same manner as in Example 2, except by using the resulting solution. The ionic conductivity of the resulting membrane at 100° C. was as low as $6\times10^{-7}$ $Scm^{-1}$.

EXAMPLE 7

Three grams of the sulfonic acid group-containing polyether ether ketone synthesized in Synthesis Example 8 and 3 g of EtIm+TfS− obtained in Synthesis Example 10 were dissolved in 20 ml of N-methyl-2-pyrrolidone. The solution was cast on a glass plate and dried in vacuo at 60° C. for 5 hours and 150° C. for 16 hours to obtain a semi-transparent membrane having a thickness of 76 μm. Even after the membrane was left to stand at 50° C. for one week, neither did EtIm+TfS− bleed out, nor was observed weight loss. The ionic conductivity of the membrane was as high as $3\times10^{-3}$ $Scm^{-1}$ at 100° C. in spite of the absence of water. Although the membrane sandwiched between electrode plates was partly pressed out of the plate edges to have its thickness reduced to 40 μm, such was non-problematic for practical use.

EXAMPLE 8

Three grams of the sulfonic acid group-containing aromatic polyether ether ketone prepared in Synthesis Example 8 was dissolved in 20 ml of N-methyl-2-pyrrolidone. The solution was cast on a glass plate and dried in vacuo at 60° C. for 5 hours and 150° C. for 16 hours to obtain a membrane having a thickness of 75 μm. A 1.00 g portion of the resulting membrane was immersed in EtIm+TfS− and left to stand at 60° C. for 6 hours. The membrane was taken out of EtIm+TfS−, wiped to remove the attached EtIm+TfS− from both sides thereof, and weighed. The membrane showed 26% increase in weight over the dry weight before immersion, which was due to absorption of EtIm+TfS−. Even after the membrane was allowed to stand at 50° C. for one week, neither did EtIm+TfS− bleed out, nor was observed weight loss.

COMPARATIVE EXAMPLE 4

Three grams of the polyether ether ketone before introduction of sulfonic acid groups was once melted on a hot plate at 400° C. and allowed to cool to prepare a disk-shaped solid having a thickness of about 1 mm and weighing 1.00 g. The thus solidified polyether ether ketone was immersed in EtIm+TfS− at 60° C. for 6 hours. The solid taken out of EtIm+TfS− and wiped to remove EtIm+TfS− from both sides thereof weighed 1.00 g, showing no gain in weight. That is, the polyether ether ketone failed to hold EtIm+TfS−.

EXAMPLE 9

A transparent membrane was prepared in the same manner as in Example 3, except for replacing EtIm+TfS− with Lut+TfS− obtained in Synthesis Example 11. When the membrane was allowed to stand at 50° C. for one week, neither did Lut+TfS− bleed out, nor was observed weight loss. The ionic conductivity of the membrane at 150° C. was as high as $8.4\times10^{-4}$ $Scm^{-1}$ despite the absence of water.

EXAMPLE 10

A white turbid membrane was obtained in the same manner as in Example 3, except for replacing EtIm+TfS− with MePy+TfS− obtained in Synthesis Example 12. When the membrane was allowed to stand at 50° C. for one week, neither did MePy+TfS− bleed out, nor was observed weight loss. The ionic conductivity of the membrane at 150° C. was as high as $4.1\times10^{-3}$ $Scm^{-1}$ despite the absence of water.

EXAMPLE 11

A transparent membrane was obtained in the same manner as in Example 3, except for replacing EtIm+TfS− with EtIm+TFSI− obtained in Synthesis Example 13. When the membrane was allowed to stand at 50° C. for one week, neither did EtIm+TFSI– bleed out, nor was observed weight loss. The ionic conductivity of the membrane at 100° C. was as high as $4.4 \times 10^{-4}$ Scm$^{-1}$ despite the absence of water.

EXAMPLE 12

Three grams of the carboxyl group-containing aromatic polyether sulfone prepared in Synthesis Example 9 and 3 g of EtIm+TfS– obtained in Synthesis Example 10 were dissolved in 20 ml of N,N-dimethylacetamide. The solution was cast on a glass plate and dried in vacuo at 60° C. for 5 hours and 120° C. for 16 hours to obtain a white turbid membrane. Even after the membrane was left to stand at 50° C. for one week, neither did EtIm+TfS– bleed out, nor was observed weight loss. In spite of the absence of water, the ionic conductivity of the membrane at 150° C. was as high as $7.5 \times 10^{-4}$ Scm$^{-1}$.

REFERENCE EXAMPLE 1

Figure 2:
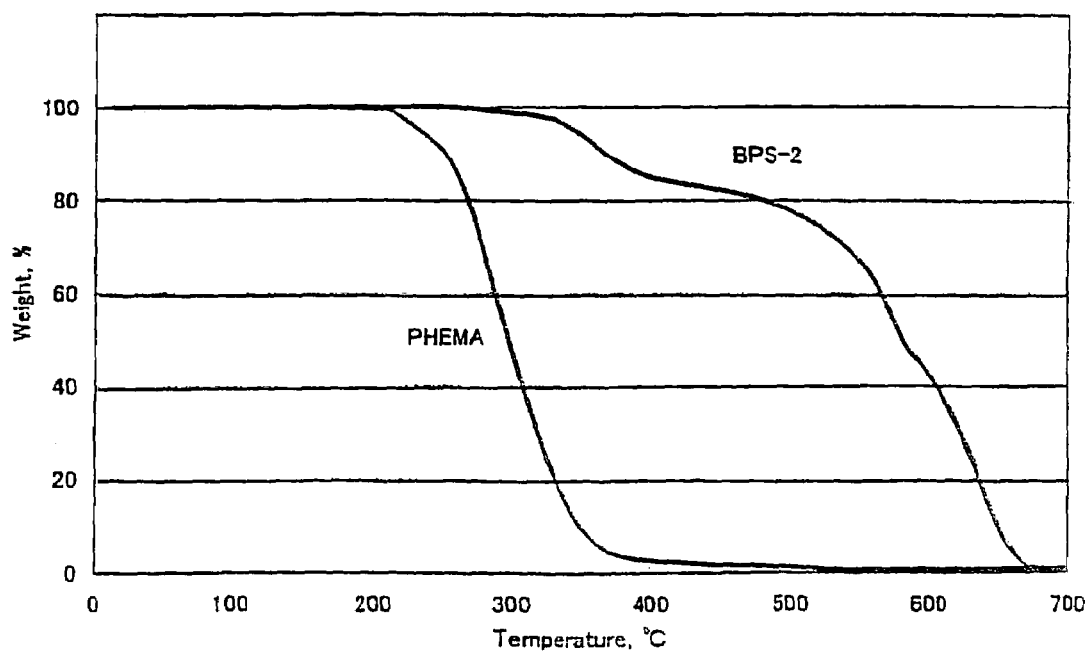
FIG. 2 is a graph showing the results of comparison of heat resistance between the BPS-2 and the PHEMA films prepared in Reference Example 1.

Three grams of BPS-2 obtained in Synthesis Example 3 was dissolved in 20 ml of N,N-dimethylacetamide. The solution was cast on a glass plate and vacuum dried at 60° C. for 5 hours and 120° C. for 16 hours to form a transparent film. Separately, a methanol solution of commercially available poly(2-hydroxyethyl methacrylate) (PHEMA) having an aliphatic hydrocarbon group in the main chain was cast on a glass plate and dried in vacuo at 70° C. for 6 hours to obtain a transparent film. The BPS-2 film and the PHEMA film were compared in pyrolysis behavior by thermogravimetry. The results obtained are shown in FIG. 2. It is apparent seen that the BPS-2 film was superior in heat resistance.

SYNTHESIS EXAMPLE 14

Synthesis of styrene-p-styrenesulfonic acid copolymer

In 80 ml of 40° C. water was dissolved 6.0 g of sodium p-styrenesulfonate, and the solution was bubbled with nitrogen for 30 minutes. To the solution were added 9.1 g of styrene and, as a polymerization initiator, 0.065 g of 4,4'-azobis(4-cyanovaleric acid) to carry out polymerization at 60° C. for 24 hours in a nitrogen atmosphere. After completion of the polymerization, the solution was poured into a large amount of 2-propanol to precipitate a white solid, which was collected by filtration. The solid was washed twice with 2-propanol and once with acetone and dried under reduced pressure to give a polystyrene copolymer containing a sulfonic acid group in sodium salt form. The resulting copolymer was treated with 1N hydrochloric acid for 2 hours, and the insoluble matter was recovered by filtration and dried under reduced pressure to yield sulfonic acid group-containing polystyrene PS-1. PS-1 had an Mw of $1.8 \times 10^6$, an Mw/Mn ratio of 2.8, and an ion exchange capacity of 1.75 mmol/g.

GPC of polystyrene polymers prepared was carried out as follows. A 0.5 wt % solution of a polymer was prepared using, as a solvent, N-methyl-2-pyrrolidone having dissolved therein lithium chloride and phosphoric acid each in concentration of 50 mM. GPC was performed using a Shodex GPC KD-806M column available from Showa Denko KK and a differential refractive index detector RID-10A from Shimadzu Corp. to obtain standard polystyrene equivalent weight average molecular weight Mw, number average molecular weight Mn, and molecular weight distribution Mw/Mn.

SYNTHESIS EXAMPLE 15

Synthesis of styrene-vinylbenzylsulfonic acid copolymer

Sulfonic acid group-containing polystyrene (PS-2), which was a styrene-vinylbenzylsulfonic acid copolymer, was synthesized in the same manner as in Synthesis Example 14, except for using 6.4 g of sodium vinylbenzylsulfonate in place of sodium p-styrenesulfonate. PS-2 had an Mw of $1.7 \times 10^6$ and an Mw/Mn ratio of 2.1. The ion exchange capacity of PS-2 was 1.06 mmol/g.

EXAMPLE 13

Two grams of the sulfonic acid group-containing polystyrene PS-1 prepared in Synthesis Example 14 and 2 g of EtIm+TfS– obtained in Synthesis Example 10 were dissolved in 20 ml of N-methyl-2-pyrrolidone. The solution was cast on a glass plate and dried in vacuo at 60° C. for 5 hours and 150° C. for 16 hours to obtain a membrane. The membrane, while opaque, did not suffer from bleeding of EtIm+TfS– nor weight loss even when allowed to stand at 50° C. for one week. The ionic conductivity of the membrane was as high as $3.6 \times 10^{-3}$ Scm$^{-1}$ at 100° C. in spite of the absence of water.

EXAMPLE 14

A membrane was obtained in the same manner as in Example 13, except for replacing PS-1 with the sulfonic acid group-containing polystyrene PS-2 obtained in Synthesis Example 15. The membrane, while opaque, did not suffer from bleeding of EtIm+TfS– nor weight loss even after it was allowed to stand at 50° C. for one week. The ionic conductivity of the membrane was as high as $3.1 \times 10^{-3}$ Scm$^{-1}$ at 100° C. in spite of the absence of water.

EXAMPLE 15

Five grams of a commercially available 5 wt % solution of a sulfonated styrene-(ethylene-butylene)-styrene triblock copolymer (styrene content: 29 wt %; sulfonation degree of the styrene unit: 45 to 55%; solvent: 1-propanol/dichloroethane mixture) and 0.25 g of EtIm+TfS– obtained in Synthesis Example 10 were mixed up. The solution was cast on a glass plate and vacuum dried at 40° C. for 2 hours and 80° C. for 16 hours to form a membrane. The membrane, while opaque, did not suffer from bleeding of EtIm+TfS– nor weight loss even after it was allowed to stand at 50° C. for one week. The ionic conductivity of the membrane was as high as $2.3 \times 10^{-3}$ Scm$^{-1}$ at 50° C. in spite of the absence of water.

COMPARATIVE EXAMPLE 5

A membrane was prepared in the same manner as in Example 13, except for replacing PS-1 with a commercially available polystyrene (Mw: 280,000). The membrane obtained after drying was white turbid and suffered from bleeding of EtIm+TfS–.

COMPARATIVE EXAMPLE 6

One-point-five grams of a commercially available styrene-(ethylene-butylene)-styrene triblock copolymer (styrene content: 29 wt %; Mw: 89,000) and 1.5 g of EtIm+TfS– obtained in Synthesis Example 10 were dissolved in 20 ml of tetrahydrofuran. The solution was cast on a glass plate and dried in vacuo at room temperature for 4 hours and 60° C. for 16 hours to form a membrane. The dried membrane was white turbid and suffered from bleeding of EtIm+TfS−.

COMPARATIVE EXAMPLE 7

Two grams of the sulfonic acid group-containing polystyrene PS-1 obtained in Synthesis Example 14 and 2 g of N-ethylimidazole were dissolved in 20 ml of N-methyl-2-pyrrolidone. A membrane was formed in the same manner as in Example 13, except for using the solution. The ionic conductivity of the membrane at 100° C. was as low as $4 \times 10^{-7}$ Scm$^{-1}$.

INDUSTRIAL APPLICABILITY

The present invention provides a polymer electrolyte composition and a polymer electrolyte membrane which are inexpensive and durable, comprise an aromatic polymer and a molten salt, exhibit high ionic conductivity even in the absence of water or a solvent, and are useful in fuel cells, secondary batteries, electric double layer capacitors, electrolytic capacitors, etc. The present invention also provides a process of producing them.

The present invention also provides a polymer electrolyte composition which is inexpensive and durable, shows high ionic conductivity even in the absence of water or a solvent, and exhibits high structure retention even in high temperatures.

The present invention also provides an economical process of producing an aromatic polyether sulfone block copolymer free from a bond of different kind in the molecular chain and useful as an aromatic polymer used in the present invention.

The invention claimed is:

1. A process of preparing an aromatic polyether sulfone block copolymer comprising (a) a segment represented by chemical formula (10):

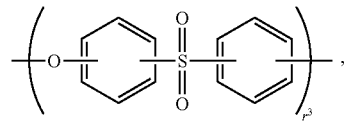

(10)

wherein r$^3$ represents an integer of 5 to 1500, and (b) a segment represented by chemical formula (11):

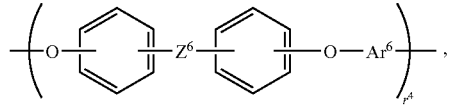

(11)

wherein Z$^6$ represents C=O or O=S=O, Ar$^6$ represents a divalent aromatic group composed of an aromatic ring, the aromatic ring is not bonded to an electron drawing group other than that which forms the molecular chain of the prepolymer, and r$^4$ represents an integer of 5 to 300, the process comprising the step of:
reacting (A) an aromatic polyether sulfone prepolymer having the segment (a) and (B) a prepolymer having the segment (b) in a solution at a temperature of 120 to 200° C. to produce an aromatic polyether sulfone block copolymer, wherein,
the prepolymer having the segment (a) is not fluorine terminated,
the prepolymer having the segment (b) has at least one terminal hydroxyl group in the form of an alkali metal salt,
the aromatic polyether sulfone block copolymer produced comprises a molecular chain formed by the segment (a) and the segment (b), and
the segments are bonded to each other by an ether bond such that there is no bonding group of a different kind of molecule between the segment (a) and the segment (b).

* * * * *